United States Patent
Togami et al.

(10) Patent No.: US 8,462,190 B2
(45) Date of Patent: Jun. 11, 2013

(54) VOICE COMMUNICATION DEVICE, VOICE COMMUNICATION METHOD, AND VOICE COMMUNICATION PROGRAM

(75) Inventors: Masahito Togami, Higashiyamato (JP); Akio Amano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1371 days.

(21) Appl. No.: 12/169,656

(22) Filed: Jul. 9, 2008

(65) Prior Publication Data

US 2009/0015651 A1  Jan. 15, 2009

(30) Foreign Application Priority Data

Jul. 11, 2007  (JP) .................. 2007-182068

(51) Int. Cl.
*H04N 7/14*  (2006.01)
*H04R 5/02*  (2006.01)

(52) U.S. Cl.
USPC ...................... 348/14.01; 381/310

(58) Field of Classification Search
USPC .......... 348/14.01–14.09; 381/57; 379/142.01, 379/142.07, 142.08
See application file for complete search history.

(56) References Cited

U.S. PATENT DOCUMENTS

| 7,154,526 | B2 | 12/2006 | Foote et al. | |
| 7,843,486 | B1 * | 11/2010 | Blair et al. | 348/14.01 |
| 2004/0013252 | A1 * | 1/2004 | Craner | 379/142.01 |
| 2005/0213739 | A1 * | 9/2005 | Rodman et al. | 379/202.01 |

FOREIGN PATENT DOCUMENTS

| JP | 06-253305 | 9/1994 |
| JP | 11-187130 | 7/1999 |
| JP | 2005-033811 | 2/2005 |
| JP | 2005-136701 | 5/2005 |

OTHER PUBLICATIONS

R. Martin, "Noise Power Spectral Density Estimation Based on Optimal Smoothing and Minimum Statistics", IEEE Trans. Speech Audio Process, T-SA-9(5), 504-512, Jul. 2001.
E. Hansler, G. Schmidt, "Acoustic Echo and Noise Control", Wiley Series, pp. 148-151, 2004.

* cited by examiner

*Primary Examiner* — Andrew C Flanders
*Assistant Examiner* — Sunita Joshi
(74) *Attorney, Agent, or Firm* — Antonelli, Terry, Stout & Kraus, LLP.

(57) ABSTRACT

Provided is a voice communication device for carrying out voice communication among a plurality of locations, including: a sound source direction identification block for identifying a direction of a sound source; a voice sender block for sending the collected voice to a different location; a voice receiver block for receiving a voice from a different location; a player block for playing the received voice; a playing information setting block for setting playing information for the voice being played; a speaker volume storage block for acquiring the direction of the sound source for which the playing information is set from the sound source direction identification block and storing the direction of the sound source in association with the playing information; and a voice manipulating block for acquiring the playing information corresponding to the direction of the sound source of the voice and manipulating the voice based on the playing information.

11 Claims, 20 Drawing Sheets

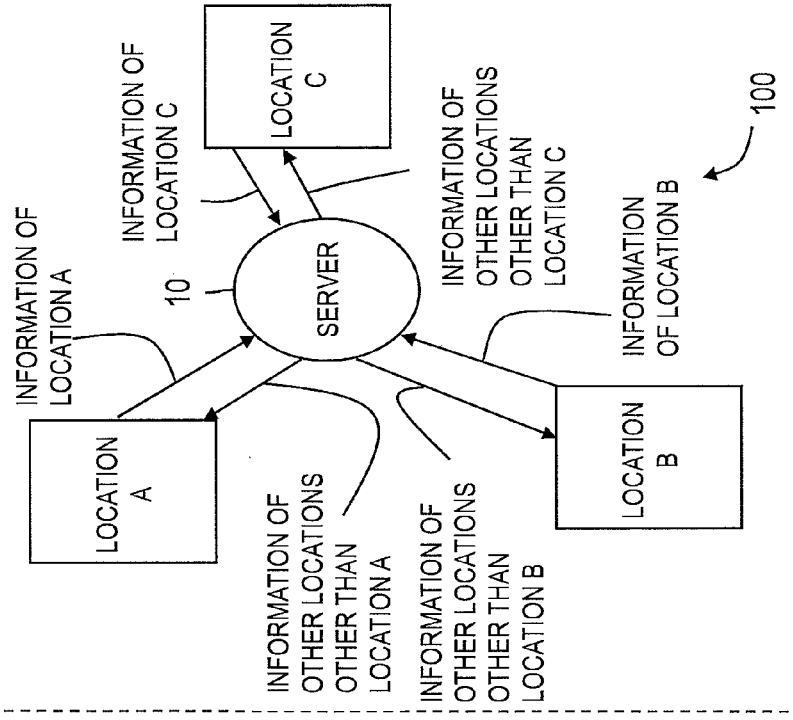

(B) TV CONFERENCE AMONG THREE OR MORE LOCATIONS (A) TV CONFERENCE BETWEEN TWO LOCATIONS

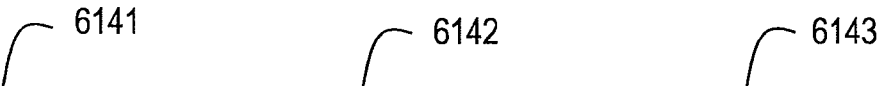

| LOCATION | RANGE | VOLUME CONFIGURATION |
|---|---|---|
| LOCATION A | AZIMUTH 0° ELEVATION 0° DISTANCE 1.0m | +10dB |
| LOCATION A | AZIMUTH -180° ELEVATION 0° DISTANCE 1.0m | -10dB |
| LOCATION A | AZIMUTH +90° ELEVATION 0° DISTANCE 1.0m | -∞dB |
| LOCATION B | AZIMUTH 0° ELEVATION -90° DISTANCE 1.0m | +20dB |
| LOCATION B | AZIMUTH -90° ELEVATION -90° DISTANCE 1.0m | -20dB |
| LOCATION C | AZIMUTH -90° ELEVATION -90° DISTANCE 1.0m | -∞dB |
| LOCATION C | AZIMUTH -90° ELEVATION 0° DISTANCE 1.0m | +10dB |
| LOCATION C | AZIMUTH -90° ELEVATION 60° DISTANCE 1.0m | -20dB |

FIG. 8

VOICE COMMUNICATION DEVICE, VOICE COMMUNICATION METHOD, AND VOICE COMMUNICATION PROGRAM

CLAIM OF PRIORITY

The present application claims priority from Japanese application P2007-182068 filed on Jul. 11, 2007, the content of which is hereby incorporated by reference into this application.

BACKGROUND OF THE INVENTION

This invention relates to a device for voice communication with a person at a remote location, such as a TV conference system, TV phone through a cellular phone, and handsfree communication through a car navigation device, and a method thereof.

There is a telephone conference system or a TV conference system in which both a first location and a second location have a speaker and a microphone, and the first and second locations are connected to each other via a network in order to talk to persons at the remote location by means of voice. This system has a problem that a voice of a person closer to a place at which the microphone is installed is received at high level, and a voice of a person farther from the place at which the microphone is installed is received at low level.

In order to address this problem, a remote controller for volume control, with which a user can amplify volume by holding down a button for volume amplification, has conventionally been used.

However, the remote controller for volume control requires a manual adjustment of the volume each time the volume of speakers changes, resulting in a problem of a complicated manipulation.

To address this problem, an AGC for correcting speaker volume automatically has been used (refer to E. Hansler, G. Schmidt, "Acoustic Echo and Noise Control", Wiley Series, pp. 148-151, 2004, and Japanese Patent Application Laid-open No. Hei 11-187130, for example).

However, the AGC has a problem that, when the volume of a speaker changes upon a change of the speaker, or the like, a period of time is required to adapt to volume after the change, and, during this period, a voice cannot be heard at a proper volume level. Moreover, when a background noise exists, the AGC may incorrectly recognize the background noise as a voice, and may incorrectly amplify the background noise, and it is thus difficult to use the AGC for a TV conference system when a background noise such as a sound of a fan for a projector exists.

There is proposed a method for adjusting an utterance level according to a position of a speaker in order to correct a volume level which is temporarily deviating from a proper level upon a change of the speaker (refer to Japanese Patent Applications Laid-open No. Hei 06-253305 and No. 2005-136701, for example). In those level adjusting methods, a position of utterance is identified according to some method, and, when an utterance position changes, according to a result of the identification, the change in utterance position is recognized. Then, a volume level corresponding to the utterance position is read from a memory, and the volume level is set to the level read from the memory. Moreover, the predicted utterance level is stored in a memory area according to the identified position of utterance. With those steps, the utterance level is adjusted upon a change of the speaker.

SUMMARY OF THE INVENTION

However, in the above-mentioned conventional examples, when the method for identifying a position of utterance employs information other than a voice, such as image information acquired by a camera, there is a demerit that a device other than a microphone is required. Moreover, even when an automatic speaker detection method according to voice activity detection employing information on the direction of a sound source of the voice is used, there is a problem that a background noise is amplified due to a detection error.

Further, with the automatic speaker volume correction such as the above-mentioned AGC, there is a problem that a speaker volume is not always corrected to a proper speaker volume desired by a user.

This invention has been made in view of the above-mentioned problems, and therefore an object of this invention to correct a volume level which is temporarily deviating from a proper level upon a change of a speaker, and also to correct a volume level to a proper level without incorrectly amplifying a background noise, and without requiring a complicated manipulation of a user.

Therefore, according to this invention, since the direction of a sound source changes when a speaker changes, by applying playing information, which corresponds to the direction of the sound source of a voice being played, from the speaker volume storage block, it is possible to make a correction which attains playing information such as a volume level set by a user, thereby making a correction to provide a proper voice without a complicated manipulation. Moreover, since a voice is corrected so that playing information (volume) is attained for respective speakers identified by information on the direction of the sound source, it is possible to prevent a background noise from being incorrectly recognized as an uttered voice, and from being incorrectly amplified.

BRIEF DESCRIPTION OF THE DRAWINGS

FIG. 2A is a block diagram showing communication configurations, as configurations for connection to two locations according to this invention.

FIG. 2B is a block diagram showing communication configurations, as configurations for connection to three locations according to this invention.

FIG. 8 shows the data structure of the speaker volume adjustment data when the volume is adjusted by a sender location of voice.

DETAILED DESCRIPTION OF THE PREFERRED EMBODIMENTS

A description will now be given of embodiments of this invention with reference to accompanying drawings.

First Embodiment

Figure 1:
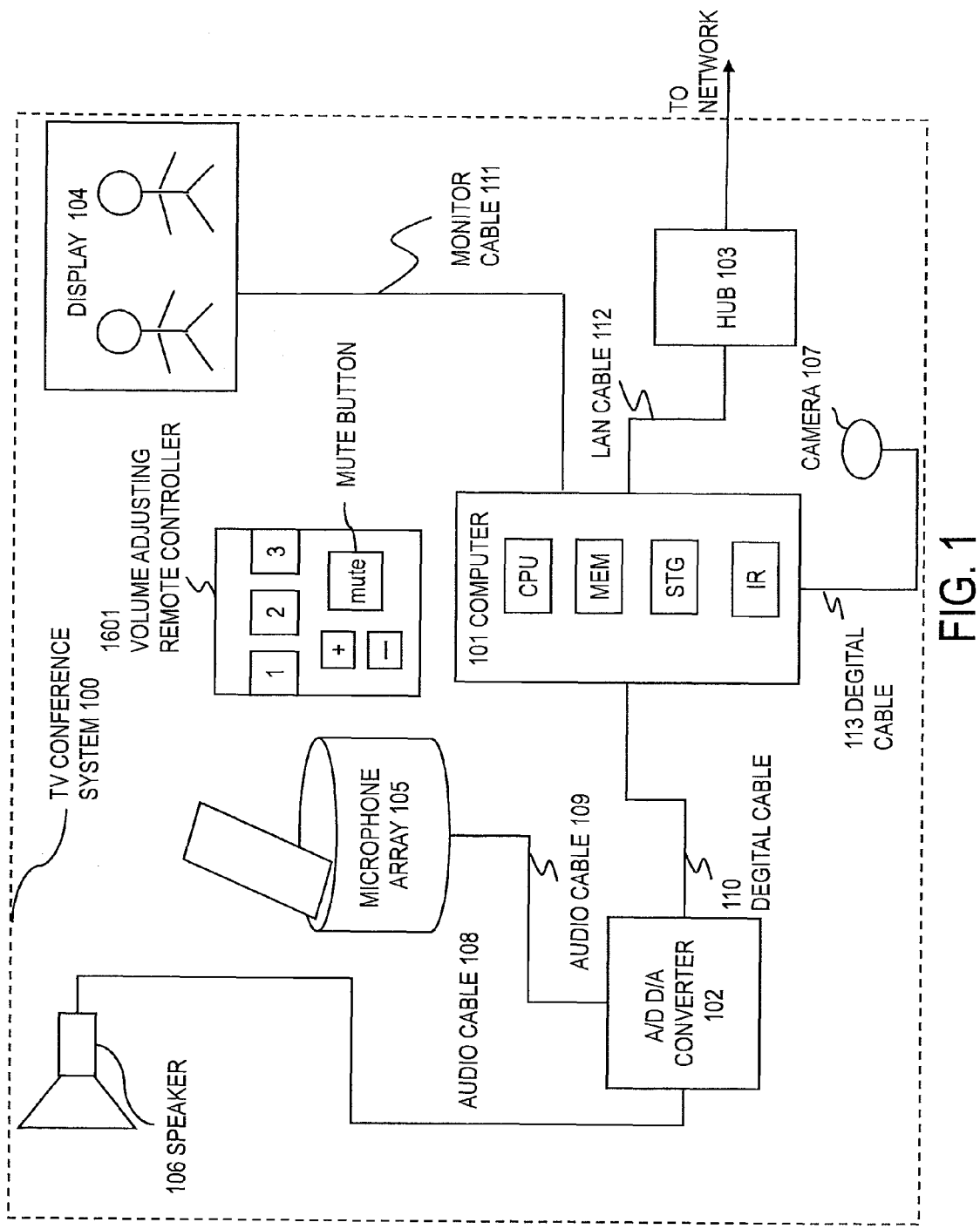
FIG. 1 shows a first embodiment of this invention, and is a block diagram showing a system configuration at one location of a TV conference system according to this invention.

FIG. 1 shows a first embodiment of this invention, and is a block diagram showing a system configuration at one location of a TV conference system. FIG. 1 shows the system configuration at one location of the TV conference system to which this invention is applied.

In a TV conference system 100, types of processing such as acoustic signal processing, image processing, and communication processing are carried out by a computer 101. The computer 101 includes a processor CPU which carries out arithmetic processing, a memory MEM which temporarily stores programs and data, a storage device STG which stores programs and data, and an infrared communication block IR which communicates with a volume adjusting remote controller 1601 by infrared rays.

To the computer 101, an A/D D/A converter 102 is connected, an analog voice signal acquired by a microphone array 105 is converted into a digital voice signal by the A/D D/A converter 102, and the digital voice signal is sent to the computer 101. The microphone array 105 includes a plurality of microphone elements (sound collecting elements). The computer 101 applies the audio signal processing to the input digital voice signal, and the voice signal, after the processing, is sent to a network via a hub 103. An image signal sent from other location to the TV conference system 100 via the hub 103 is sent to a display 104, and is shown on a screen. After the volume of a voice signal sent from other location via the hub 103 is adjusted by the computer 101, the adjusted voice signal is converted into an analog signal by the A/D D/A converter 102, and is output from a speaker 106.

A voice acquired by the microphone array 105 includes an acoustic echo transmitted from the speaker 106 to the microphone array 105, and it is necessary to remove the acoustic echo. Processes such as the removal of the acoustic echo is carried out by the computer 101, which will be described later. In FIG. 1, as a digital cable 110 and a digital cable 113, UOSB cables or the like are employed.

FIGS. 2A and 2B are block diagrams showing communication configurations, as configurations for connection to other locations when the TV conference system 100 shown in FIG. 1 is employed to communicate with remote locations, when a server 10 is provided at the center of the locations, and the server 10 and the locations are mutually connected via networks. FIG. 2A shows a case of two locations (locations A and B), and FIG. 2B shows a case of three locations (locations A, B, and C) or more. It should be noted that the respective locations A to C are connected via the networks, and are configured as shown in FIG. 1.

In the TV conference between the two locations shown in FIG. 2A, information sent from one location is once stored in the server 10, and then the server 10 sends the information to the other location. The information sent by the server 10 to the respective locations includes voice information, image information, information on the direction of a sound source, and system parameters of the respective locations. The voice information sent from the server 10 is played by the speaker 106 at the other location. The microphone array 105 provided at the respective locations A and B acquires an utterance of a user at the respective locations A and B, and the utterance is sent to the other location via the computer 101.

As shown in FIG. 2B, in the TV conference among three or more locations, signals of the microphone arrays 105 provided at all the locations are once accumulated in the center server 10. Then, the server 10 outputs mixed voices obtained by mixing voices received from locations other than a sender location to the respective locations.

Figure 3B:
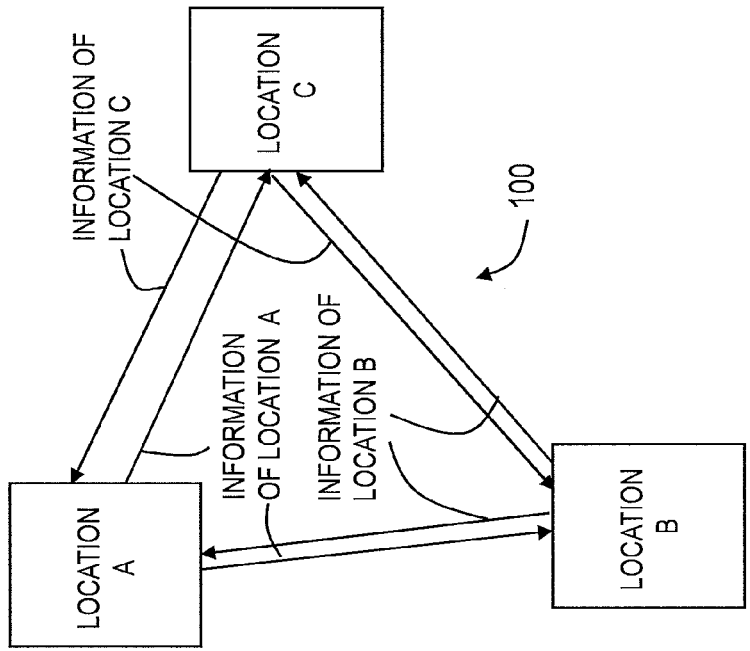
FIG. 3B is a block diagram showing communication configurations, as configurations for connection to three locations according to this invention.
Figure 3A:
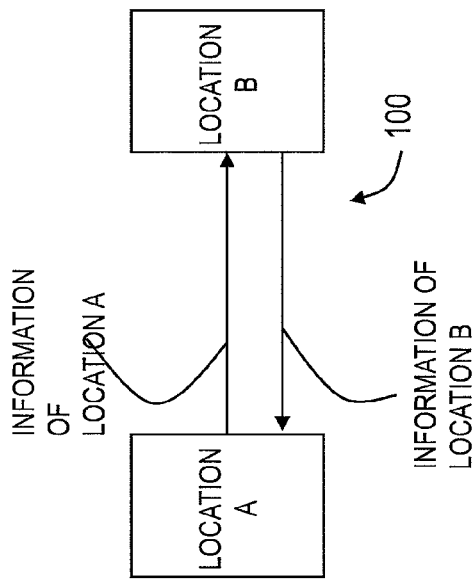
FIG. 3A is a block diagram showing communication configurations, as configurations for connection to two locations according to this invention.

FIGS. 3A and 3B are block diagrams showing communication configurations, as configurations for connection to other locations when the TV conference system 100 shown in FIG. 1 is employed to communicate with remote locations, when the server 10 shown in FIGS. 2A and 2B is not interposed between the locations. FIG. 3A shows a case of two locations (locations A and B), and FIG. 3B shows a case of three locations (locations A to C) or more.

In the TV conference between the two locations shown in FIG. 3A, information is sent from the location A directly to the location B without being routed through a server. The information sent by the location A includes voice information, image information, information on the direction of a sound source, and system parameters of the respective locations. The voice information sent from the location A is played by the speaker 106 via the computer 101 at the other location (location B). The microphone array 105 provided at the respective locations A and B acquires an utterance of a user at the respective locations A and B, and the utterance is sent to the other location via the computer 101.

In the TV conference among three or more locations shown in FIG. 3B, information from the respective locations is sent to all the other connected locations using a communication method such as a multicast. Then, the respective locations receive the sent information. Voice signals are mixed by the computer 101 provided at the receiver location, and the mixed signal is played by the speaker 106. The microphone array 105 provided at the respective locations receives an utterance of a user at the respective locations.

Figure 4:
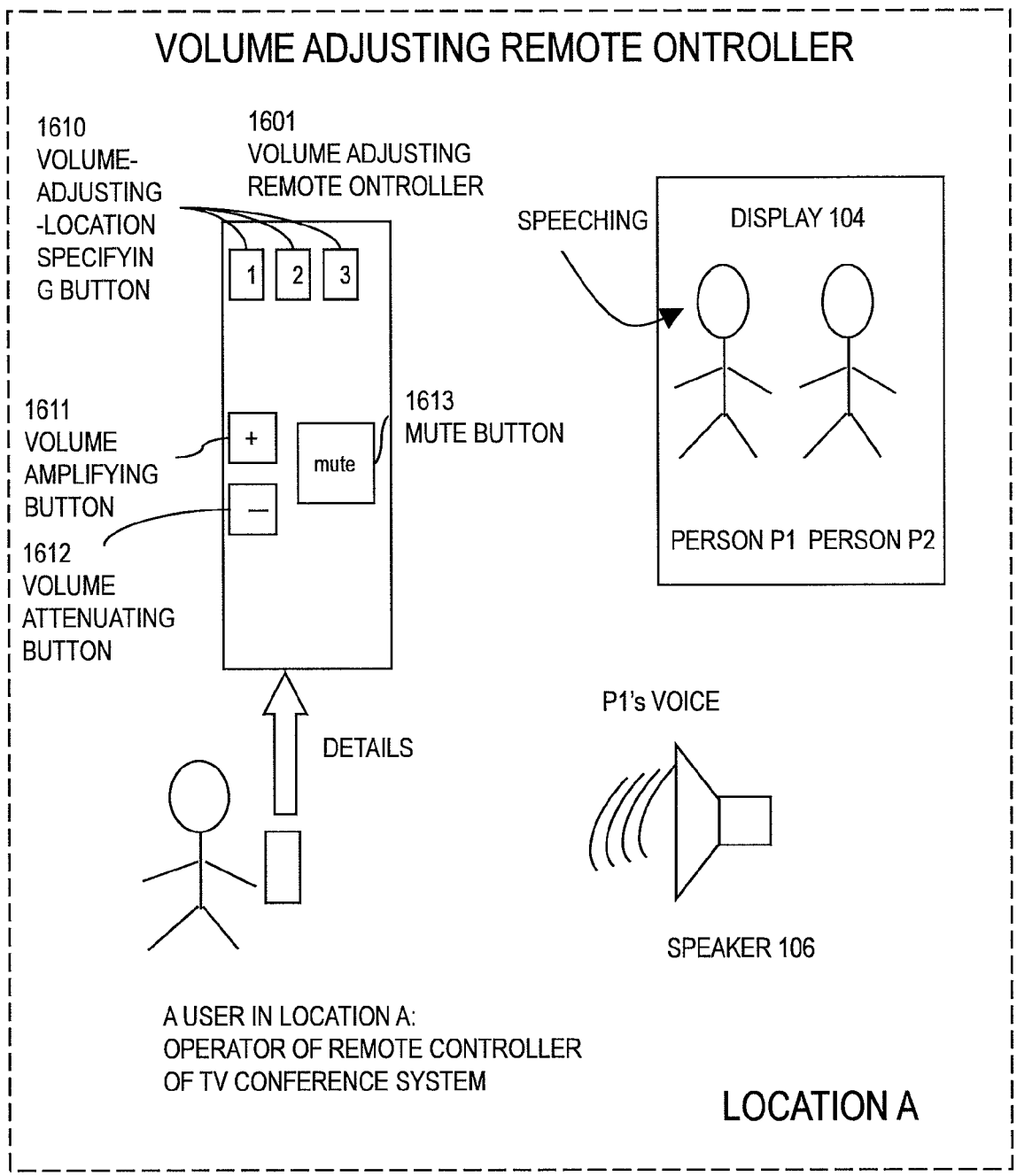
FIG. 4 describes a state of use of the TV conference system using the volume adjusting remote controller 1601 according to this invention.

FIG. 4 describes a state of use of the TV conference system 100 using the volume adjusting remote controller 1601 according to this invention. FIG. 4 shows a state in which a user at the location A holding the volume adjusting remote controller 1601 uses the TV conference system 100. The display 104 shows persons P1 and P2 at other locations. The person P1 of the two persons on the display 104 is speaking, and the voice of the person P1 is played on the speaker 106 via the computer 101.

Moreover, the respective locations are provided with the volume adjusting remote controller 1601 used for adjusting the volume of a speaker at the other locations, and, as shown in FIG. 4, the volume adjusting remote controller 1601 includes a volume-adjusting-location specifying button 1610 used to specify a subject location of the volume adjustment, a volume amplifying button 1611 used to turn up the volume of the specified location, a volume attenuating button 1612 used to turn down the volume of the specified location, and a mute button 1613 used to mute a voice.

By holding down the volume amplifying button ("+" button) 1611, the user can turn up the volume of the speaker which the user is presently listening to. Similarly, by holding down the volume attenuating button ("−" button) 1612, the user can turn down the volume for the speaker which the user is presently listening to. By holding down the mute button 1613, the user can mute the volume of the speaker which the user is presently listening to. By holding down those buttons, the volume for the voice of the speaker which the user is presently listening to is changed. However, after the speaker is switched to a new speaker, the computer 101 automatically adjusts the volume for the new speaker, and the manipulation directed to the present volume will not cause a problem upon switching of speaker.

The volume-adjusting-location specifying button 1610 is a button used to specify a location whose volume is to be adjusted when a plurality of locations are connected. By selecting a location whose volume is to be adjusted with this button, and then holding down the volume amplifying button 1611, the volume attenuating button 1612, and the mute button 1613, it is possible to narrow down the locations whose volume is to be adjusted to one location.

In FIG. 4, the user at the location A is listening to the voice played by the speaker 106, the volume for the person P1, who is a speaker, is low, and the user thus wants to turn up the volume slightly. In this case, of the above-mentioned three buttons "+", "−", and "mute" on the volume adjusting remote controller 1601, the user holds down the volume amplifying button 1611, thereby turning up the volume. The volume adjustment up to the above process is similar to the volume adjustment in the conventional TV conference system described above.

Then, the utterance of the person P1 ends, an utterance of the person P2 starts, and the volume for the person P2 is higher than the volume for the person P1. In this case, the user has held down the "+" button (the volume amplifying button 1611), therefore, in the conventional TV conference system described above, the volume for the playing is fairly high, and the user needs to hold down the "−" button (the volume attenuating button 1612) this time. However, when the speaker is switched to the person P1 again, then the volume of the playing sound is too low, and the user has to hold down the "+" button again. In this way, the remote controller for volume adjustment in the conventional TV conference system requires the very complicated manipulation for adapting to difference in volume of respective persons.

The volume adjusting remote controller 1601 according to this invention detects that the speaker has changed according to information on the direction of a sound source, reads a stored value of volume set at the time of an utterance of the person P2, not the volume set during the utterance of the person P1, and adjusts the volume based on the stored value. As a result of this volume adjustment, even when the speaker has changed to the person P2, it is possible to listen to the voice at a proper volume without complicated manipulations.

Moreover, according to this invention, since the "mute" can be set for respective persons, it is possible to cut a voice of a speaker who is uttering what is irrelevant to a theme of a conference while the TV conference system 100 is being used, thereby listening to only voices relating to the theme of the conference.

Figure 5:
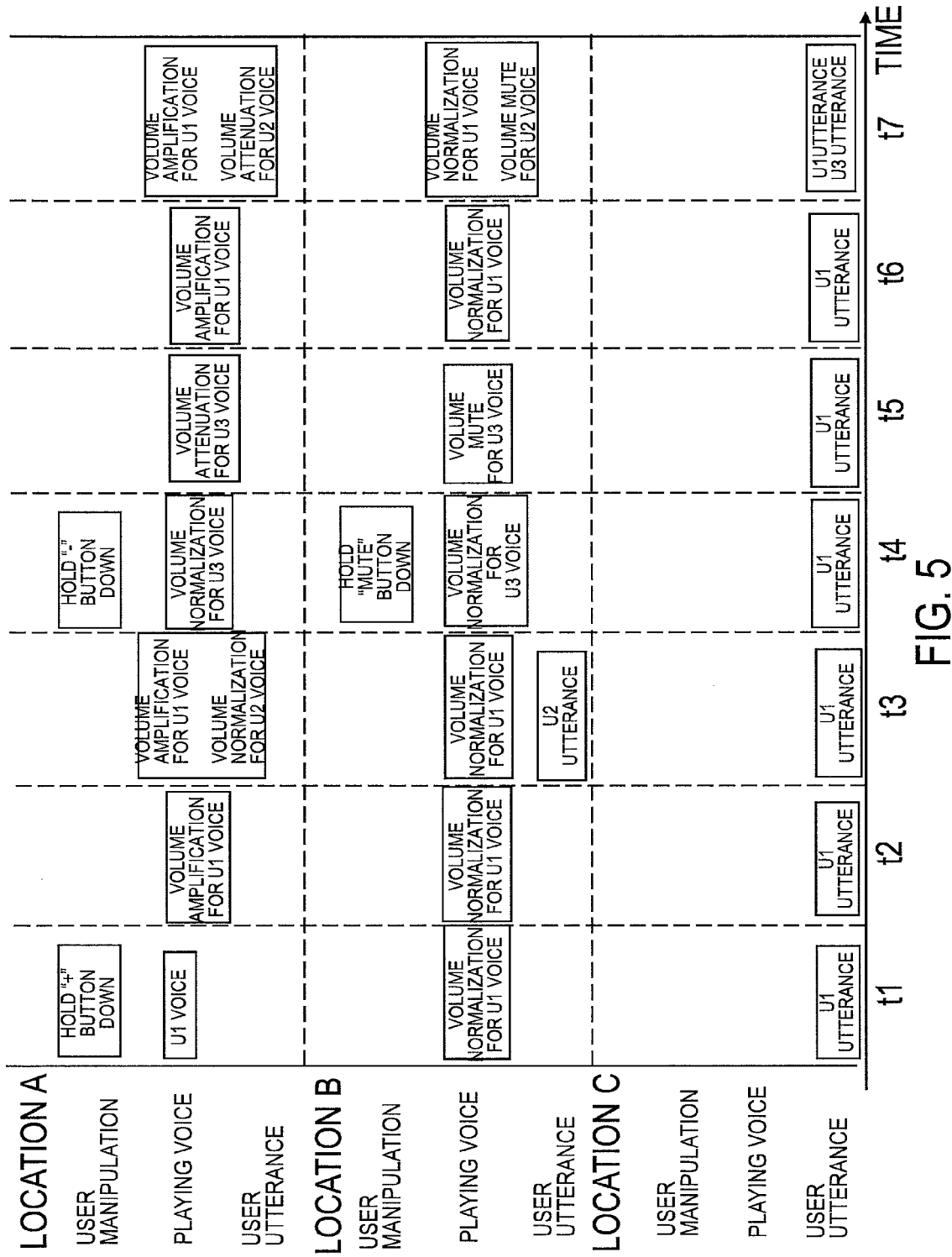
FIG. 5 is a time chart of the utterance and playing of voices in a multi-location TV conference system in which three locations: locations A, B, and C are connected with each other such as ones shown in FIGS. 2B and 3B according to this invention.

FIG. 5 is a time chart of the utterance and playing of voices in a multi-location TV conference system 100 in which three locations: locations A, B, and C are connected with each other such as ones shown in FIGS. 2B and 3B, and, in FIG. 5, the horizontal axis is assigned to time.

At a time point t1, only a user U1 at the location C utters a voice. On this occasion, at the locations A and B, the voice of the user U1 is played. At the location A, the voice of the user U1 is played at a low volume. On this occasion, at the location A, the "+" button of the volume adjusting remote controller 1601 is held down to turn up the volume for the user U1. Then, at a next time point t2, at the location A, the voice of the user U1 is amplified, and then played.

On the other hand, at the location B, a user does not adjust the volume, the voice of the user U1 is played at a normal level. At a time point t3, a user U2 at the location B utters a voice. On this occasion, at the location A, while the voice of the U1 is still amplified, the voice of the user U2 is played at the normal volume.

At a time point t4, at the location C, a user U3 starts utterance. Then, a function of detecting change of speaker automatically detects a change of speaker based on the direction of a sound source, and changes the volume configuration to a configuration for the U3. On this occasion, at the location A, the voice of the user U3 is played at a high volume, therefore the user holds down the "−" button to turn down the volume. Moreover, at the location B, the user determines that the utterance of the user U3 is not relevant to the theme of the conference, and holds down the "mute" button.

At a time point t5, at the location B, the voice of the user U3 is muted, and, at the location A, the voice of the user U3 is attenuated and played. At a time point t6, the user U1 again utters a voice. Again, the function of detecting change of speaker automatically detects the change of speaker, and changes the volume configuration to the configuration for the user U1. On this occasion, at the location A, the user held down "+" button when the user U1 uttered the voice, therefore the voice of the user U1 is amplified and played. At the location B, the volume was not adjusted when the user U1 uttered the voice, therefore the voice of the user U1 is played at the normal volume.

At a time point t7, at the location C, the user U1 and the user U3 utter a voice at the same time. On this occasion, the computer 101 at the location C determines that a state of a simultaneous utterance occurs, separates the input voices at respective frequencies, and generates the respective voices of the user U1 and the user U3. Then, the computer 101 adjusts the respective volume thereof according to the respective volume configurations, and composes the voices again. On this occasion, the volume configurations of the users vary for the respective locations A and B, therefore the computers 101 at the respective locations A and B adjust the volume according to the respective volume configurations.

Figure 6:
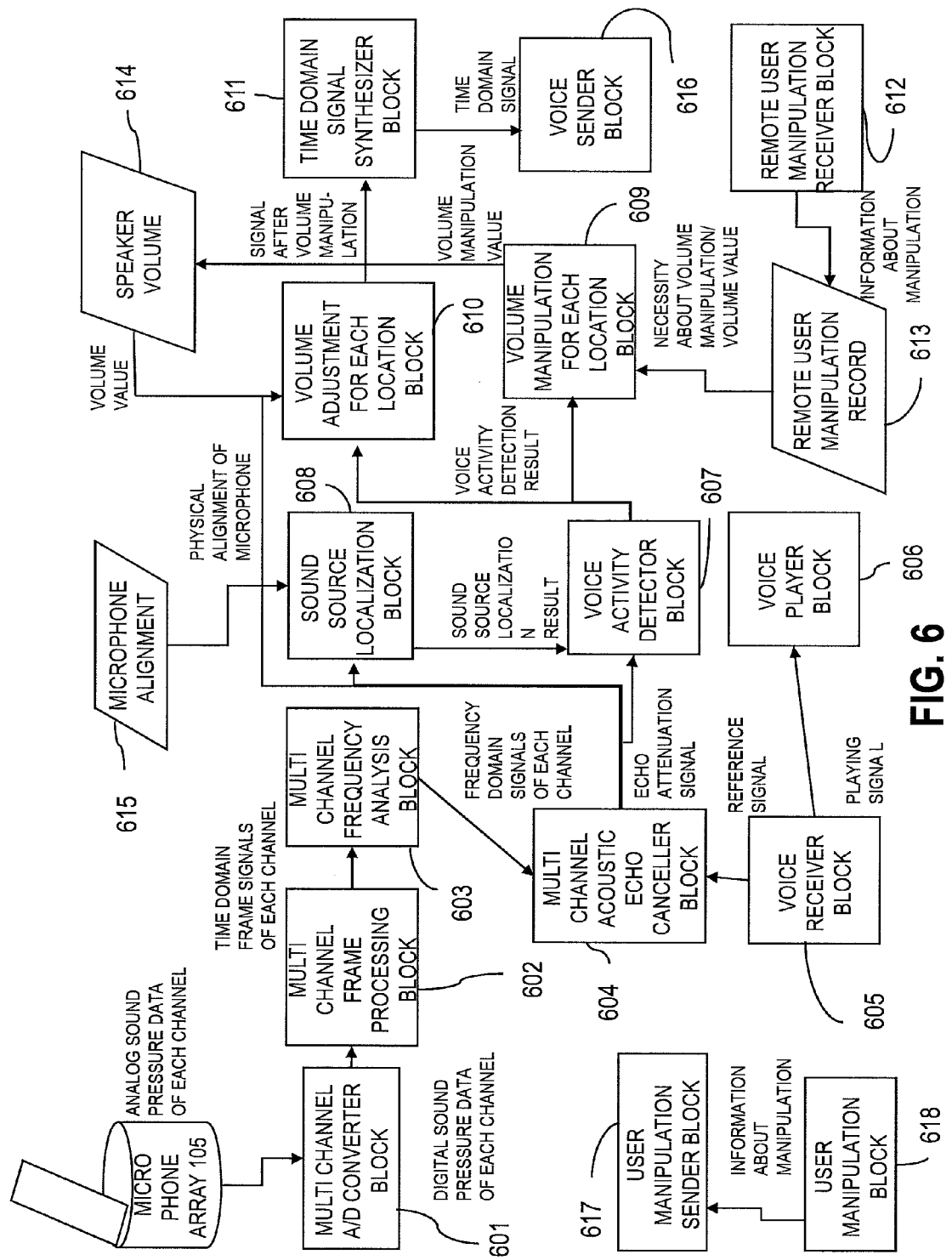
FIG. 6 is a functional block diagram of the TV conference system.

FIG. 6 is a functional block diagram of the TV conference system 100 according to this invention. According to the configuration shown in FIG. 6, the volume is adjusted for a voice at a location at which the voice is recorded, and the voice after the volume thereof has been adjusted is sent to the other locations. In FIG. 6, a process provided by a multi channel A/D converter block 601 is carried out by the A/D D/A converter 102 shown in FIG. 1, functions provided by an extent from a multi channel frame processing block 602 to a user manipulation sender block 617 are carried out by the computer 101, and a process provided by a user manipulation block 618 is carried out by the volume adjusting remote controller 1601.

Analog sound pressure data of the each microphone element acquired by the microphone array 105 is converted into digital sound pressure data xi(t) of the each microphone element by the multi channel A/D converter block 601. On this occasion, "i" denotes an index (0, 1, ... M−1) which indicates a number assigned to the microphone element. "M" denotes the total number of the microphone elements. "t" denotes a discrete time point at a sampling period.

The converted digital sound pressure data xi(t) is input to the computer 101, and is passed to the multi channel frame processing block 602. The multi channel frame processing block 602 shifts xi(t) from t=τS to t=τS+F−1 to Xf_i(t,τ) from t=0 to t=F−1. On this occasion, "τ" is referred to as frame index, and is incremented by 1 after the process from the multi channel frame processing block 602 to a voice sender block 616 have been completed. "S" is referred to as frame shift, and is the number of samples shifted for each frame. "F" is referred to as frame size, and is the number of samples processed at one for each frame.

Then, the signal Xf_i(t,τ) is passed to a multi channel frequency analysis block 603. The multi channel frequency analysis block 603 applies processes such as a removal of a DC component, and windowing such as the Hamming windowing, the Hamming windowing, and the Blackman windowing to the signal Xf_i(t,τ), and then applies the short-time Fourier transform to the signal Xf_i(t,τ), thereby transforming the signal into a signal Xf_i(f,τ) in the frequency domain. The frequency domain signals of each channel are sent to a multi channel acoustic echo canceller block 604.

Signals sent from other locations are received by a voice receiver block 605. The voice receiver block 605 receives voices according to the TCP/IP and RTP protocols. In the multi-location TV conference system 100 shown in FIG. 2 in which the server 10 is interposed between the locations, the voice receiver block 605 receives the voices in a state in which voice signals sent from the other locations are mixed. In this case, the voice receiver block 605 directly outputs the mixed voice.

On the other hand, as shown in FIG. 3, in the multi-location TV conference system 100 in which the server 10 is not interposed between the locations, and the computers 101 at the respective locations communicate with each other by means of the multicast or the like, the voice receiver block 605 directly receives voice signals, which are sent from respective locations, from the respective locations. In this case, the voice receiver block 605 mixes the voices sent from the respective locations, and then outputs a mixed voice. A voice player block 606 outputs the mixed voice sent from the other locations to the speaker, and plays the mixed voice on the speaker 106.

The multi channel acoustic echo canceller block 604, based on a copy signal (reference signal) of the mixed voice received from the voice receiver block 605, and the frequency domain signals Xf_i(f,τ) of each microphone element acquired from the multi channel frequency analysis block 603, outputs an echo attenuation signal used to attenuate an acoustic echo signal component output from the speaker 106. For the attenuation carried out by the acoustic echo canceller block 604, a widely-known algorithm such as the NLMS algorithm may be employed, and, according to this invention, a difference in acoustic echo canceller does not make an essential difference in performance.

A frequency domain signal for which the acoustic echo component has been attenuated by the multi channel acoustic echo canceller block 604 (echo attenuation signal) is represented as E_i(f,τ).

The frequency domain signal E_i(f,τ) is sent to a sound source localization block 608 and a voice activity detector block 607. The sound source localization block 608 identifies a direction of arrival of the voice from sound source included in the input signal based on information of a physical alignment of microphone 615 of the microphone array 105 set in advance. The identification of the direction of arrival of the voice from sound source employs the corrected delay-and-sum array method. A detailed description will later be given of the configuration of the sound source localization block 608. The sound source localization block 608, when a new sound source direction is identified, generates a new record in a speaker volume 614. It should be noted that the microphone alignment 615 is stored in the memory MEM or the storage device STG of the computer 101.

The voice activity detector block 607 calculates volume P from the frequency domain signal E_i(f,τ) for which the acoustic echo has been attenuated in the following equation 1:

$$P = \sum_{i=0}^{M-1} \sum_{f=0}^{f=f_{max}-1} |E\_i(f,\tau)|^2$$

Then, the voice activity detector block 607 detects a voice activity from the calculated volume P according to a method described later.

The voice activity detector block 607, based on information on whether a voice activity has been detected or not, outputs a direction of arrival φ of the largest sound source in the voice activity. The output result of the voice activity detector block 607 is sent to a volume adjustment for each location block (voice manipulation block) 610.

The volume adjustment for each location block 610 manipulates the signal E_i(f,τ) according to volume value acquired from a result of the voice activity detection based on the following equation 2:

$$E\_i(f,\tau) = Vloc(\phi) E\_i(f,\tau)$$

In the above-mentioned equation 2, as volume vector Vloc (φ), volume configuration 6143 set in the speaker volume 614 is read. When the speaker volume 614 contains information (−∞) of muting a voice in the direction φ, the volume vector Vloc (φ) is set to 0, which completely mutes the voice. The value of the volume vector Vloc (φ) varies according to location, and the volume is adjusted for the respective locations. A frequency domain signal O_loc,i(f,τ) after the volume adjustment is sent to a time domain signal synthesizer block 611, and is converted into a time domain signal O_loc,i(t,τ) according to the inverse FFT. The time domain signal O_loc, i(t,τ) is added to overlap at every predetermined frame periods, and is converted into a time domain signal O2_loc,i(t) by applying the inverse of the window function. Then, the converted time domain signal O2_loc,i(t) is sent to the voice sender block 616. It should be noted that the speaker volume 614 is stored in the memory MEM or the storage device STG of the computer 101, and is set as described later.

The voice sender block 616, when the server 10 is interposed between the locations, sends the time domain signals (voice signals) O2_loc,i(t) generated for the respective locations to the server 10. If the server 10 is not interposed, the voice sender block 616 sends the time domain signals O2_loc,i(t) to the respective locations according to the protocols such as the TCP/IP or RTP. If the multicast is used, since the same signal is sent to all the locations, this system configuration cannot employ the multicast.

A remote user manipulation receiver block 612 communicates, according to the TCP/IP protocol or the RTP protocol, with the server 10 or a remote CPU (computer 101 at other location), thereby receiving information about volume manipulation carried out by a remote user (user at the other location).

The information about volume manipulation contains information on (volume configuration) how much a voice is to be amplified, attenuated, or muted in which range at which location, and can be configured similarly to speaker volume adjustment data shown in FIG. 8 described later.

The information about volume manipulation carried out by remote user received from the other location is stored in a remote user manipulation record 613. The remote user manipulation record 613 also stores information on a time point at which the information about volume manipulation is stored.

A volume manipulation for each location block 609 carries out the following processes only when a voice activity is detected. If a voice activity is not detected, the volume manipulation for each location block 609 ends without carrying out any processes. The volume manipulation for each location block 609 carries out volume manipulation if the remote user manipulation record 613 stores information about volume manipulation, and a difference between a time point when the information about volume manipulation was stored and a time point when the voice activity was detected is smaller than the maximum time difference defined in advance.

On the other hand, if the difference between the time point when the information about volume manipulation was stored and the time point when the voice activity was detected is larger than the predetermined maximum time difference, the volume manipulation for each location block 609 determines that the information about volume manipulation is old, and does not carry out the volume manipulation. The volume manipulation is repeated sequentially starting from the first record until all the information about volume manipulation stored in the records of manipulation of remote users 613 is processed, and deletes the referred information about volume manipulation from the remote user manipulation record 613. The volume manipulation includes the three functions: amplification, attenuation, and muting. The amplification and the attenuation are respectively defined as increment and decrement from a past volume configuration stored in the speaker volume 614. For example, volume adjustment for an amplification of +6 dB is carried out by reading a past volume configuration from the speaker volume 614, and incrementing the volume configuration by 6 dB. Volume adjustment for an attenuation of −6 dB is carried out by reading a past volume configuration from the speaker volume 614, and decrementing the volume configuration by 6 dB. The muting can be considered as a case in which −∞ dB is specified for the attenuation, and may be handled as a special process for setting the volume completely to 0, which is different from the attenuation.

It should be noted that the computer 101 at other location, upon receiving a manipulation from the volume adjusting remote controller 1601, sends the present time and an amount of manipulation carried out on the volume adjusting remote controller 1601 as information about volume manipulation. Then, the computer 101 at the receiver location stores the information about volume manipulation received from the other location by the remote user manipulation receiver block 612 as volume configuration for a speaking speaker at a time point contained in the information about volume manipulation in the remote user manipulation record 613. For example, it is possible to acquire the direction of a speaking speaker from the sound source localization block 608 upon the reception of information about volume manipulation from other location, and to associate the received information about volume manipulation with the speaker. Moreover, for received information about volume manipulation, an amount of manipulation carried out on the volume adjusting remote controller 1601 may be converted into volume configuration according to a function or the like set in advance. For example, when the amount of manipulation is a period in which the "+" button of the volume adjusting remote controller 1601 is being manipulated, a function, which increases an amount of correction for the volume configuration as the manipulation period increases, may be set.

The volume manipulation for each location block 609 adjusts the volume based on the information about volume manipulation in the remote user manipulation record 613, and then, based on the amount of correction for the volume configuration and the direction of the speaker set in the used information about volume manipulation, updates volume configuration corresponding to a direction stored in the speaker volume 614 with amount of correction for the volume. Then, the volume manipulation for each location block 609 deletes the used information about volume manipulation from the remote user manipulation record 613.

In this way, the volume manipulation for each location block 609 changes the volume of the voice each time when information about volume manipulation is received from other location, thereby updating the volume configuration corresponding to the direction of a speaker.

Moreover, the manipulation carried out on the volume adjusting remote controller 1601 by the user at the base location is carried out on the user manipulation block 618. The user manipulation block 618 is used when the computer 101 receives a command of the volume adjusting remote controller 1601 via the infrared communication block IR. Then, the user manipulation sender block 617 converts a manipulation received by the computer 101 from the volume adjusting remote controller 1601 into an amount of manipulation for the volume, adds a time point when the manipulation was carried out to the amount of manipulation thereby generating information about volume manipulation, and sends the information about volume manipulation to the other locations.

Figure 7:
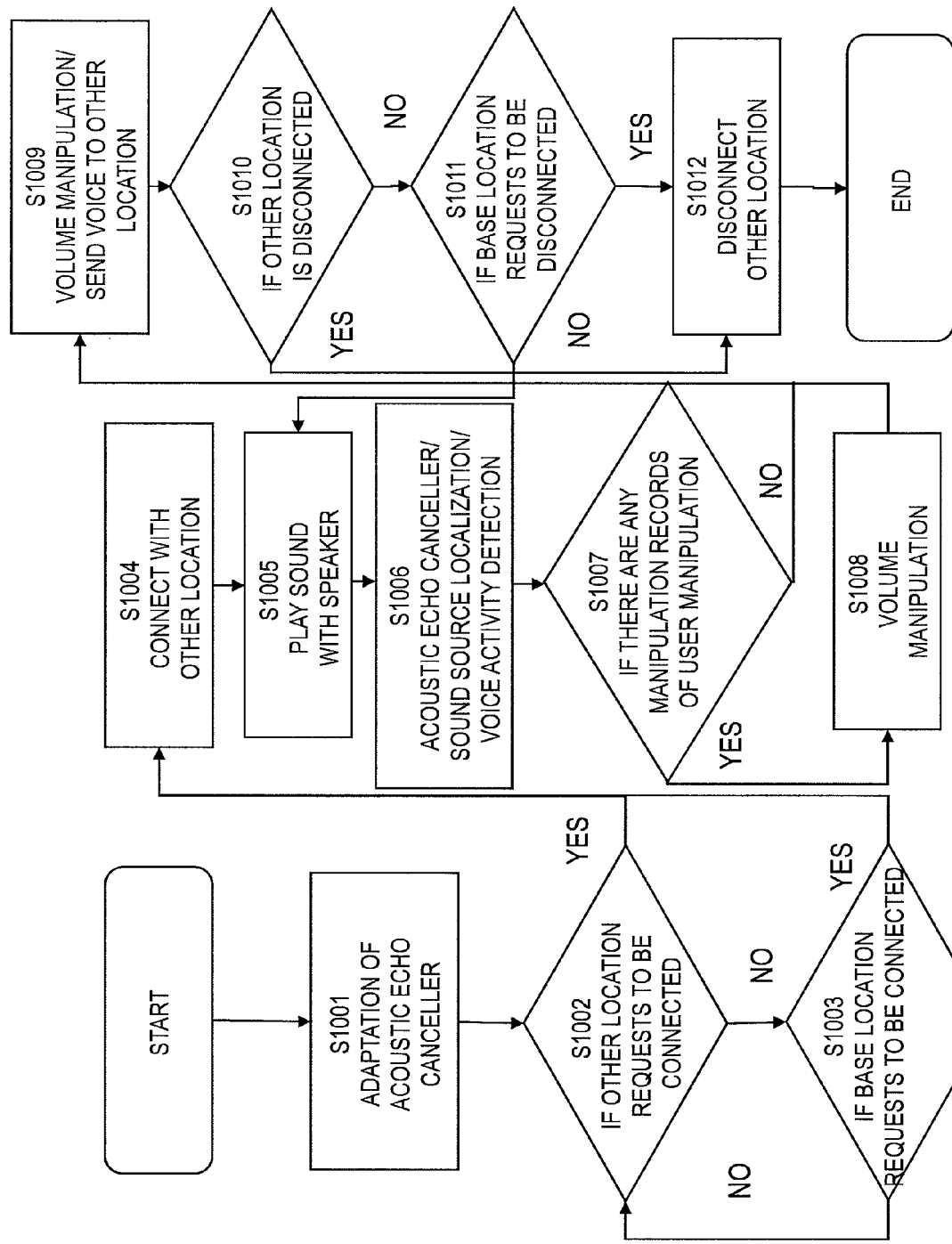
FIG. 7 is a flowchart showing a process from a start to an end of the TV conference system of the type in which a sender location of voice adjusts the volume (FIG. 3A or 3B) according to this invention.

FIG. 7 is a flowchart showing a process from a start to an end of the TV conference system 100 of the type in which a sender location of voice adjusts the volume (FIG. 3A or 3B) according to this invention.

The TV conference system 100 is started by starting the components such as the computer 101 and the microphone array 105 shown in FIG. 1 at the respective locations. After the TV conference system 100 starts, the computer 101 carries out adaptation of acoustic echo canceller (S1001).

In the adaptation of acoustic echo canceller, the computer 101 plays a white signal and a full band signal according to the NLMS method, which changes frequency along time, on the speaker 106, thereby initializing a filter for the acoustic echo canceller.

Then, the computer 101 of the TV conference system 100 waits until it receives a connection request indicating that the other location requests to be connected (S1002) from other location, or sends a connection request indicating that the base location requests to be connected (S1003) from the base location to other location. In Step S1002, the computer 101 checks whether a connection has been established from other location, and, if the connection has been established, connects to the other location (S1004). Otherwise, the computer 101 checks whether a connection request has been sent from the base location (S1003), and, if the connection request has been sent, connects to the other location (S1004). If a connection request has not been sent from the base location, the computer 101 returns to Step S1002, and waits until the base location receives a connection request from other location, or sends a connection request to other location.

If the connection to other location is established, the computer 101 plays a voice of the other location on the speaker 106 in Step S1005, and repeats processes such as the acoustic echo canceller, the sound source localization, and the voice activity detection (S1006). On this occasion, the computer 101 always checks whether there are any records of volume manipulation carried out by a user at the other location (the remote user manipulation record 613 shown in FIG. 6) (S1007), if there are records of volume manipulation, proceeds to Step S1008, and carries out the volume manipulation. Moreover, the computer 101 carries out the volume manipulation for respective receiver locations based on the output result of the sound source localization in Step S1006, and sends voices after the volume manipulation to the other locations (S1009).

Then, in Step S1010, the computer 101 determines whether the other location has been disconnected, and, if the other location has been disconnected, ends the process for the conference (S1012). If the other location has not been disconnected, the computer 101 checks whether a disconnection request indicating that the base location requests to be disconnected (S1011) has been sent from the base location, and, if a disconnection request has been sent, the computer 101 disconnects the other location (S1012), and ends the process. If a disconnection request has not been sent, the computer 101 returns to Step S1005, and repeats the process subsequent to the playing sound the speaker 106.

FIG. 8 shows the data structure of the speaker volume adjustment data when the volume is adjusted by a sender location of voice. The speaker volume adjustment data is stored in the speaker volume 614 shown in FIG. 6, and contains three types of information: receiver location 6141, adjustment range of sound source 6142, and volume configuration 6143. For example, a first line of FIG. 8 implies that a sound source is in a range of "azimuth: 0°", "elevation: 0°", and "distance: 1.0 m", and volume to be sent to the location A is amplified by 10 dB and then is sent. It should be noted that, to the information on the location 6141, a location name or an identifier of the receiver location is set. Moreover, to the range 6142, the azimuth, the elevation, the distance, and the like with respect to the microphone array 105 are set. Moreover, when the volume of a voice is adjusted on the computer 101 at a sender location, the speaker volume adjustment data shown in FIG. 8 includes only data applied to voices collected at the base location, the direction (azimuth) of a sound source identified by the sound source localization block 608 is set to the information on the adjustment range of sound source 6142, and volume configuration determined by the volume manipulation for each location block 609 based on information about volume manipulation received from other location is set to the volume configuration 6143.

Figure 9:
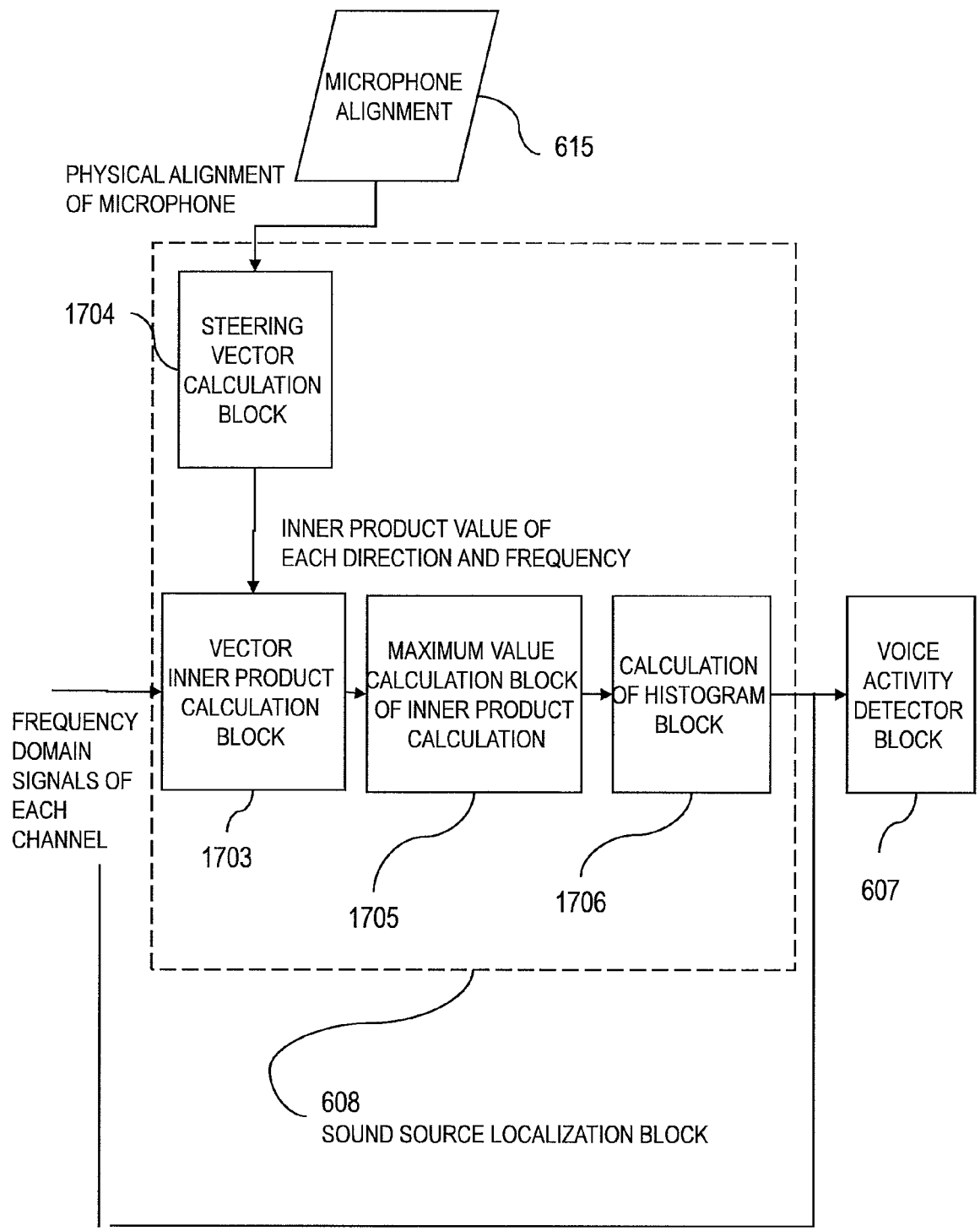
FIG. 9 is a detailed block diagram when the sound source localization (identification of direction of arrival of voice from sound source) according to the corrected delay-and-sum array method.

FIG. 9 is a detailed block diagram when the sound source localization (identification of direction of arrival of voice from sound source) according to the corrected delay-and-sum array method, and the sound activity detection are carried out respectively by the sound source localization block 608 and the voice activity detector block 607 shown in FIG. 6.

The frequency domain signal (signal with attenuated echo) $E\_i(f,\tau)$ is input from the multi channel acoustic echo canceller block 604 to the sound source localization block 608. The sound source localization block 608 converts the frequency domain signal $E\_i(f,\tau)$ for which the acoustic echo component has been attenuated into a vector form:

$$E(f,\tau)=[E\_0(f,\tau), E\_1(f,\tau), \ldots, E\_M-1(f,\tau)]$$

Moreover, in the sound source localization block 608, an input signal to the microphone element i is represented as $A\theta\_i(f)$ where θ is the direction of arrival of the voice from the sound source and an amplitude level at the location of the sound source is 1.

The distance between the sound source and the microphone element i is so long that it can be assumed to be infinite distance. Then, based on the vectorized frequency domain signal and the input signal to the microphone element i, vectorization is carried out as:

$$A\theta(f)=[A\theta\_0(f,\tau), A\theta\_1(f,\tau), \ldots, A\theta\_M-1(f,\tau)]$$

The vector Aθ(f) after the square norm of Aθ(f) is normalized to 1, and the phase component of $A\theta\_0(f,\tau)$ is normalized to 0 is still referred to as the same variable name Aθ(f). When the room temperature of the environment in which the computer 101 is present is constant, the sound propagates in the physical space at constant velocity of sound C [m/s]. Moreover, when a sound is emitted from a sound source evenly in respective directions, according to the energy conservation low, the power from the sound source attenuates inversely proportional to the square of distance. In other words, the amplitude attenuates proportional to the distance. Therefore, the input signal Aθ(f) to the microphone element i can be calculated based on the microphone alignment 615. If the frequency domain signal $E\_i(f,\tau)$ is constituted only by a component coming from the direction of sound source θ, the frequency domain signal $E\_i(f,\tau)$ should be represented as:

$$E\_i(f,\tau)=S(f,\tau)A\theta(f)$$

S(f,τ) is a scalar quantity. On this occasion, the direction of arrival φ is not θ. Since the square norm of Aθ(f) is normalized to 1, the following equation 3 holds:

$$1=A_\theta(f)^* A_\theta(f) \cong A_\phi(f)^* A_\theta(f)$$

Therefore, Θ represented by the following equation 4 is equal to the direction of sound source φ.

$$\Theta = \underset{\theta}{\operatorname{argmax}} |A_\theta(f)^* E\_i(f, \tau)|^2$$

According to the corrected delay-and-sum array method, Θ(f, τ) obtained by the following equation 5 is used as an estimation of the direction of sound source for a frame τ and a frequency f.

$$\Theta = \underset{\theta}{\operatorname{argmax}} |A_\theta(f)^* E\_i(f, \tau)|^2$$

Then, based on this direction of sound source, a histogram P(θ) is generated for the respective directions of sound source θ according to:

$$P(\theta) = \sum_f \delta(\theta = \Theta(f, \tau))$$

$$\delta(\text{true}) = 1,$$

$$\delta(\text{false}) = 0$$

Figure 10:
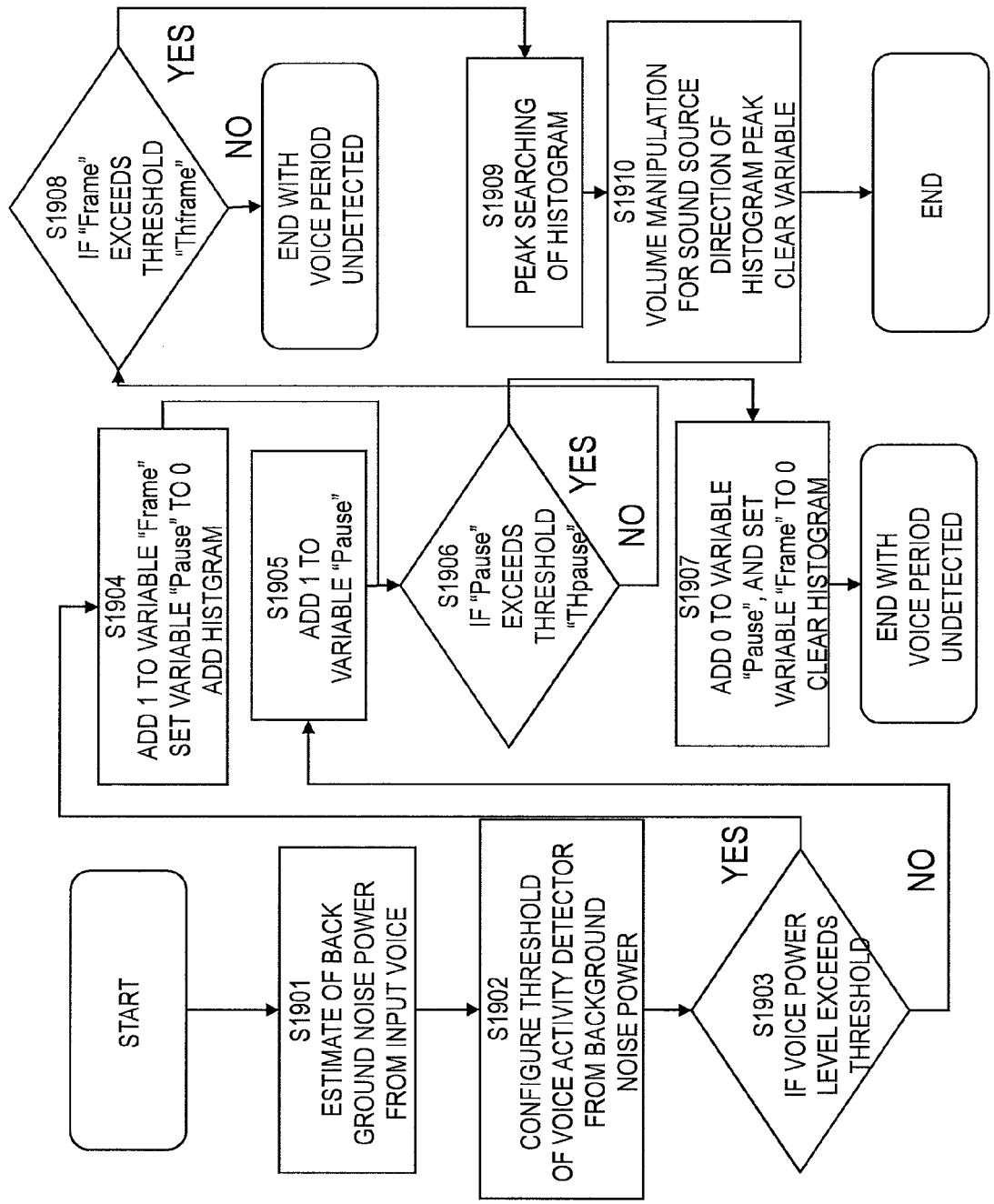
FIG. 10 is a flowchart showing an example of a process carried out by the voice activity detector block 607 of the computer 101, and is a process flow when a speaker volume set by a user is adjusted according to a result of the automatic detection of a voice activity.
Figure 11:
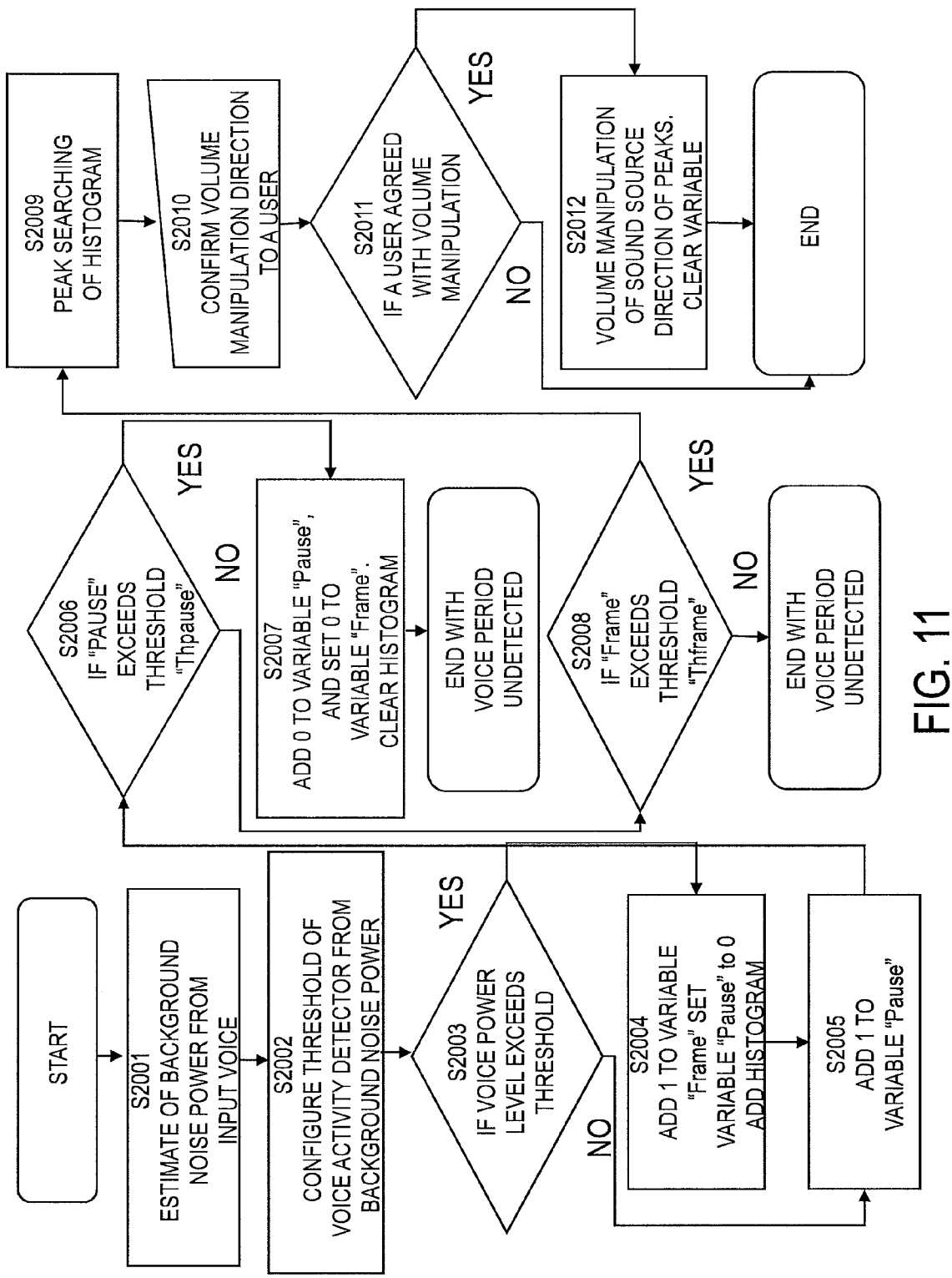
FIG. 11 is a flowchart showing a process flow for the voice activity detection and the volume manipulation in which, when the volume is adjusted in Step S1910 of FIG. 10.

In FIG. 9, a steering vector calculation block 1704 calculates the input signal Aθ(f) to the microphone element i. A vector inner product calculation block 1703 calculates an inner product of the input signal Aθ(f) to the microphone element i and the frequency domain signal (signal with attenuated echo) E_i(f,τ) for the respective directions of sound source. A maximum value calculation block of inner product calculation 1705 calculates the estimated direction of arrival Θ for the respective frames τ and the respective frequencies f based on the result obtained from the vector inner product calculation block 1703 according to the above equations. A calculation of histogram block 1706 calculates the histogram P(θ) for the respective directions of sound source θ according to the above equation 6. The sound source localization block 608 outputs P(θ) and the estimated direction of arrival Θ for the respective frames τ and the respective frequencies f. The voice activity detector block 607 detects a voice activity based on the volume of the input signal as described next. FIGS. 10 and 11 show process flows for the sound activity detection and the volume manipulation.

FIG. 10 shows an example of a process carried out by the voice activity detector block 607 of the computer 101, and is a process flow when a speaker volume set by a user is adjusted according to a result of the automatic detection of a voice activity.

First, the voice activity detector block 607 estimates a background noise power from an input voice power level (S1901). The background noise power can be estimated according to the minimum statistics (refer to R. Martin, "Noise power spectral density estimation based on optimal smoothing and minimum statistics", IEEE Trans. Speech Audio Process, T-SA-9(5), 504-512, 2001, for example). A threshold for detecting the voice activity is set based on the background noise power (S1902). The threshold of the voice activity detection is set to a constant a plurality of the estimated background noise power, for example. The set threshold and the input voice power level are compared with each other (S1903), and if the voice power level exceeds the threshold, a variable Frame is added by 1. Moreover, a Pause is set to 0. Then, the histogram of direction of sound source P(θ) is added to SumP(θ) (S1904). If the voice power level does not exceed the threshold, the Pause is added by 1 (S1905). Then, the voice activity detector block 607 determines whether the Pause exceeds a predetermined threshold ThPause (S1906), and if the Pause exceeds the threshold ThPause, 0 is set to the variables Pause and Frame, the histogram is cleared, and the process ends with voice period undetected (S1907).

On the other hand, if the Pause does not exceed the predetermined threshold ThPause, the voice activity detector block 607 determines whether the variable Frame exceeds a predetermined threshold ThFrame (S1908), and if the variable Frame exceeds the predetermined threshold ThFrame, the voice activity detector block 607 sets max (SumP(θ)) as the estimated direction of arrival Θ, calculates the peak P(θ) of the histogram, and outputs the peak as the direction of sound source (S1909).

Then, the volume for the estimated direction of arrival Θ is manipulated by volume configuration stored in the speaker volume 614. Then, the variables such as Frame, Pause, and SumP(θ) are cleared to 0 (S1910). Then, the process ends.

The manipulation of the volume configuration 6143 of the speaker volume 614 in Step S1910 is carried out by searching the speaker volume adjustment data in the speaker volume 614, and then reading the volume configuration 6143 for a range of sound source 6142 having an azimuth corresponding to the estimated direction of arrival Θ.

FIG. 11 shows a process flow for the voice activity detection and the volume manipulation in which, when the volume is adjusted in Step S1910 of FIG. 10, the direction of sound source to be adjusted is shown to the user, and, after an approval is obtained, the value is changed.

First, the voice activity detector block 607 estimates a background noise power from an input voice power level (S2001). The background noise power can be estimated according to the minimum statistics (refer to R. Martin, "Noise power spectral density estimation based on optimal smoothing and minimum statistics", IEEE Trans. Speech Audio Process, T-SA-9(5), 504-512, 2001, for example). Then, a threshold for detecting the voice activity is set based on the background noise power (S2002). The threshold of the voice activity detection is set to a constant a plurality of the estimated background noise power, for example. The set threshold and the input voice power level are compared with each other (S2003), and if the voice power level exceeds the threshold, a variable Frame is added by 1. Moreover, a Pause is set to 0. Then, the histogram of direction of sound source P(θ) is added to SumP(θ) (S2004). If the voice power level does not exceed the threshold, the Pause is added by 1 (S2005). Then, the voice activity detector block 607 determines whether the Pause exceeds a predetermined threshold ThPause (S2006), and if the Pause exceeds the threshold ThPause, 0 is set to the variables Pause and Frame, the histogram is cleared (S2007), and the process ends with voice period undetected.

On the other hand, if the Pause does not exceed the predetermined threshold ThPause, the voice activity detector block 607 determines whether the variable Frame exceeds a predetermined threshold ThFrame (S2008), and if the variable Frame exceeds the predetermined threshold ThFrame, the voice activity detector block 607 sets max (SumP(θ)) to the estimated direction of arrival Θ, calculates the peak P(θ) of the histogram, and outputs the peak as the direction of sound source (S2009). Then, the voice activity detector block 607 outputs a popup screen or a voice guidance which asks a user whether the volume can be changed while the direction of sound source as a direction for the volume manipulation is output to the display 104 (S2010). If the user approves the volume manipulation by clicking an "OK" button on the popup screen or the like, the voice activity detector block 607 updates the volume in the estimated direction of arrival Θ by the volume configuration stored in the speaker volume 614. Then, the variables such as Frame, Pause, and SumP(θ) are cleared to 0 (S2010). Then, the process ends. If the user does not approve the volume manipulation, the process ends.

The manipulation (setting) of the volume in Step S2010 is carried out by searching the speaker volume adjustment data in the speaker volume 614, and reading the volume configuration 6143 for a range of sound source 6142 having an azimuth corresponding to the estimated direction of arrival Θ.

Figure 12:
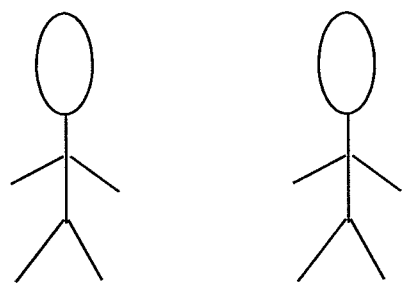
FIG. 12 is an example of a screen of the user interface which shows information on the direction of sound source on the display 104 thereby supporting the volume manipulation by a user.

FIG. 12 is an example of a screen of the user interface which shows information on the direction of sound source on the display 104 thereby supporting the volume manipulation by a user. The user can confirm that which speakers are presently speaking by viewing this screen, thereby more precisely manipulating the speaker volume.

As described above, this invention includes the sound source localization block 608 for estimating a direction of sound source, the voice activity detector block 607 for estimating a voice activity based on volume, the volume adjustment for each location block 610 for identifying which speaker utters based on information on the direction of sound source across the entire voice activity, and setting the volume corresponding to the speaker, and the volume manipulation for each location block 609 for manipulating only the volume of a speaker who has uttered before and after the volume manipulation carried out on the volume adjusting remote controller 1601 by a user. As a result, it is possible to set a proper volume for the respective speakers, and, when a speaker is switched, since the volume is automatically manipulated by automatically reading volume set for the subject speaker by a user in advance from the speaker volume 614, it is also possible to eliminate a complicated manipulation of the volume by the user, resulting in an increase in operability of the TV conference system 100.

Thus, according to this invention, it is possible to prevent the volume from temporarily deviating from a proper level when a speaker is switched, and to correct the volume to a proper level for respective speakers without a complicated manipulation of the volume by a user.

Moreover, since the correction is carried out so that volume configured for a speaker identified by the information on the direction of sound source is attained, it is possible to prevent a background noise from being incorrectly recognized as an uttered voice, and from being incorrectly amplified.

Second Embodiment

FIGS. 13 to 17 show a second embodiment, which has a configuration in which a server 10 is provided between the locations shown in FIG. 2 according to the first embodiment, and the server 10 carries out the volume manipulation.

Figure 13:
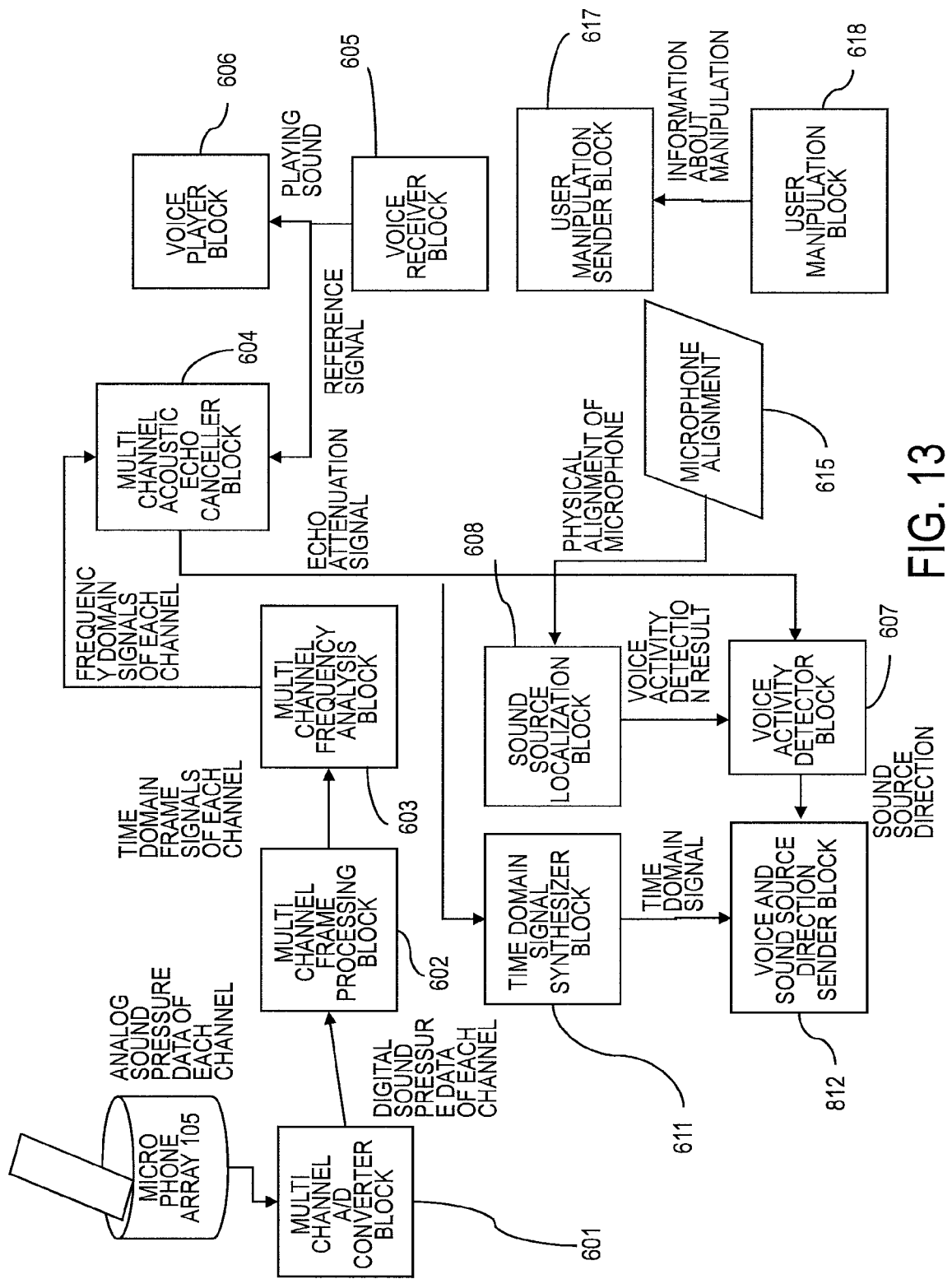
FIG. 13 is a block diagram showing a configuration of a computer system on the client (location) side when the volume is manipulated by the server according to the second embodiment.
Figure 14:
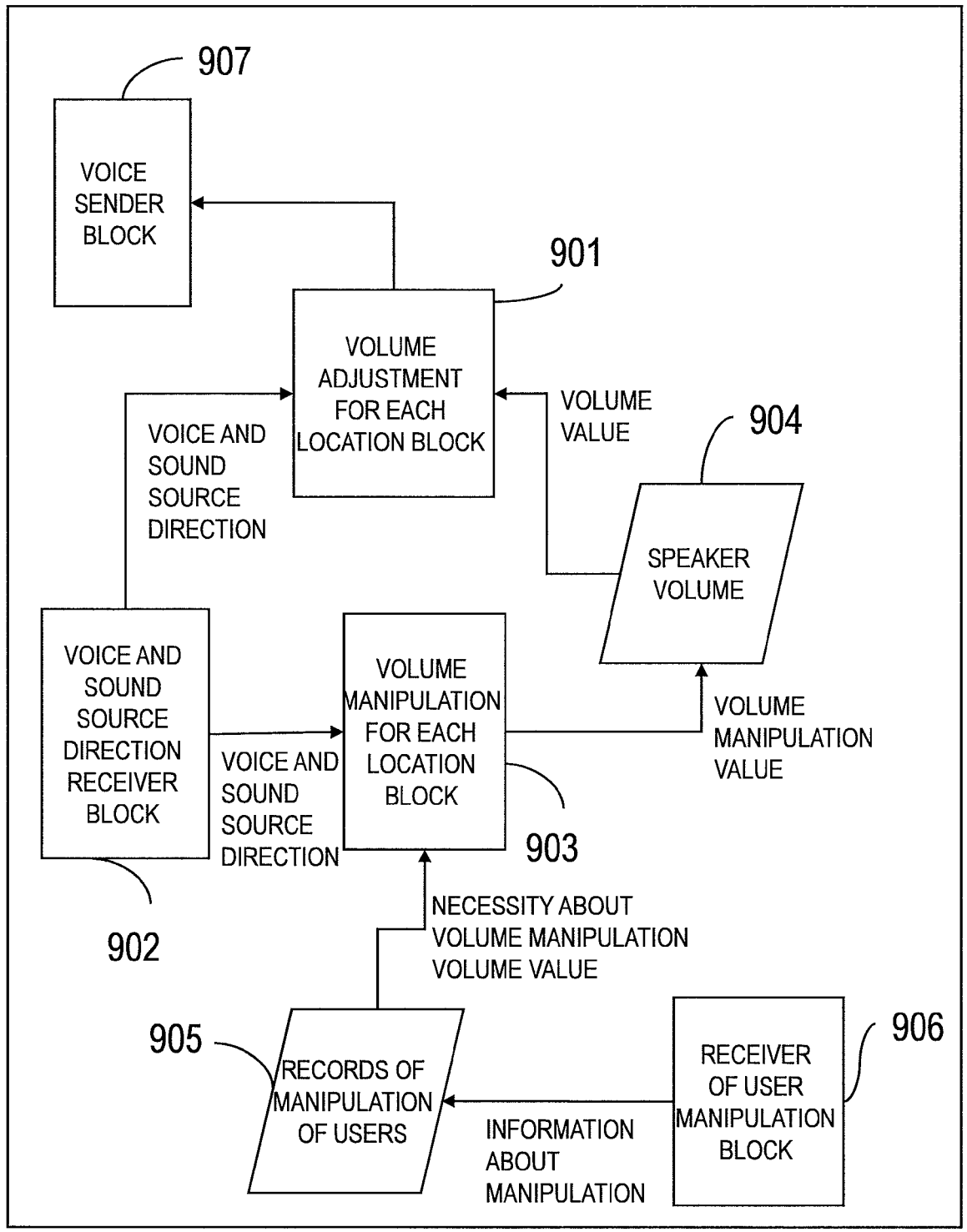
FIG. 14 is a block diagram showing a configuration of the server 10 for carrying out the volume manipulation according to the second embodiment.

FIG. 13 is a block diagram showing a configuration of a computer system on the client (location) side when the volume is manipulated by the server 10 according to the second embodiment. FIG. 14 shows a configuration on the server 10 side.

In FIG. 13, a process in a multi channel A/D converter block 601 is carried out by the A/D D/A converter 102 shown in FIG. 1, and a process subsequent to a multi channel frame processing block 602 is carried out by a computer 101. Moreover, same components are denoted by same numerals as those shown in FIG. 6 of the first embodiment, and will not be further explained.

In the computer system at the respective locations according to the second embodiment, in order for the server 10 to adjust the volume, the processing blocks relating to the volume (volume manipulation for each location block 609 and volume adjustment for each location block 610) are moved to the server 10, and the direction of the speaker (direction of sound source) and a voice signal obtained by removing the background noise from the voice detected by the microphone array 105 are sent to the server 10.

The computer 101 sends information including the location of the speaker (angle with respect to microphone array=direction of sound source) and the voice (time domain signal) to the server 10, and the information is distributed to the other locations via the server 10. A difference from FIG. 6 according to the first embodiment is that a voice and sound source direction sender block 812 for sending the time domain signal and the direction of the sound source to the other locations via the server 10 is provided in place of the voice sender block 616 according to the first embodiment. Moreover, the second embodiment is different from the first embodiment in that the user manipulation sender block 617 sends the information about volume manipulation to the server 10.

The identification of the direction of the sound source, the removal of the background noise, and the like are the same as those in FIG. 6 according to the first embodiment, and will not be further explained.

FIG. 14 is a block diagram showing a configuration of the server 10 for carrying out the volume manipulation according to the second embodiment.

A receiver of user manipulation block 906 receives information about volume manipulation of a user sent from the respective locations. The received information about volume manipulation is sent to and recorded in records of manipulation of users 905. Information recorded in the records of manipulation of users 905 includes a source location of manipulation, a destination location of manipulation, and contents of manipulation, and time of record is recorded together therewith.

A voice and sound source direction receiver block 902 receives information on a voice (time domain signal) O2_loc, i(t) and information on an estimated direction of arrival Θ (direction of sound source) sent from the respective locations together. A volume manipulation for each location block 903 manipulates the volume of the voice (time domain signal) O2_loc,i(t) sent from the respective sender locations of the voice if the estimated direction of arrival Θ is not NULL. Further, the manipulation of volume is carried out for respective receiver locations of the voice. The volume manipulation for each location block 903 extracts all information about volume manipulation, in which a destination location of manipulation coincides with the sender location of the voice, from the information about volume manipulation contained in the records of manipulation of users 905, and sequentially processes the information about volume manipulation starting from one having the oldest time of record. The volume manipulation for each location block 903 carries out the process only if a difference between the time of record and the present time is less than the maximum time difference defined in advance. If a difference between the time of record and the present time exceeds the maximum time difference defined in advance, the process is not carried out.

The volume manipulation for each location block 903 searches a speaker volume 904 for a corresponding past speaker volume with the estimated direction of arrival Θ of the sender location of the voice, the information on the destination location of manipulation, and the information on the source location of manipulation as search keys. Then, the volume manipulation for each location block 903 manipulates an extracted speaker volume (volume configuration) based on the information about volume manipulation carried out by a user. This manipulation includes three types of manipulation: amplification; attenuation; and muting. For example, if the manipulation is an amplification of +6 dB, the volume manipulation for each location block 903 stores the speaker volume amplified by +6 dB in the speaker volume 904.

A volume adjustment for each location block 901 adjusts, for the respective receiver locations of the voice, the volume of the voice/direction of the sound source for the respective sender locations of the voice (locations) sent from the voice and sound source direction receiver block 902. The volume adjustment for each location block 901 searches the speaker volume 904 for volume configuration used for the adjustment with the sender location of the voice, the receiver location of the voice, and the direction of the sound source as search keys. The volume adjustment for each location block 901 adjusts the volume by multiplying the searched volume configuration by the voice signal. Then, the volume adjustment for each location block 901 outputs, for the respective receiver locations of the voice, a signal obtained by mixing the signals with the adjusted volume received from all the sender locations of the voice other than that received from the receiver location, and a voice sender block 907 sends the mixed signals to the respective locations.

Figure 15:
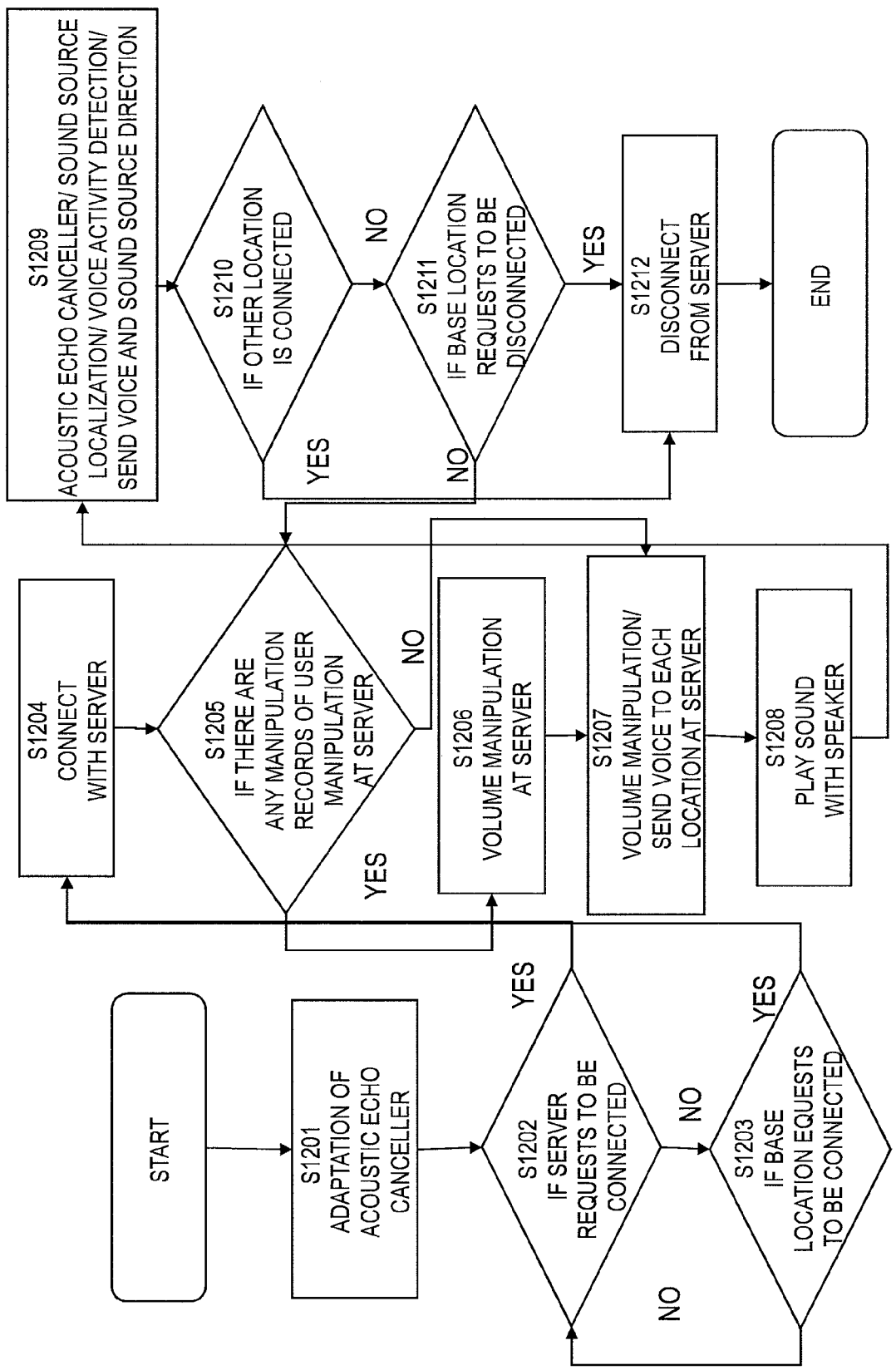
FIG. 15 is a flowchart showing a process according to the second embodiment from a start to an end of the TV conference system 100 of the type in which the server 10 adjusts the volume (FIG. 2A or 2B) according to this invention.

FIG. 15 is a flowchart showing a process according to the second embodiment from a start to an end of the TV conference system 100 of the type in which the server 10 adjusts the volume (FIG. 2A or 2B) according to this invention.

The TV conference system 100 is started by starting the components of the system such as the computer 101 and the microphone array 105, as shown in FIG. 1 at the respective locations, and also by starting the server 10. After the start of the TV conference system 100, the computer 101 at the respective locations first carries out the adaptation of the acoustic echo canceller in Step S1201.

In the adaptation of the acoustic echo canceller, the computer 101 plays a white signal and a full band signal according to the NLMS method, which changes in frequency along time, on the speaker 106, thereby initializing the filter for the acoustic echo canceller.

Then, the computer 101 of the TV conference system 100 waits until the computer 101 receives a connection request indicating that the server requests to be connected (S1202) from the server 10, or a connection request indicating that the base location requests to be connected (S1203) is sent from the base location to the server 10. In Step S1202, the computer 101 checks whether a connection has been established from the server 10, and connects to the server 10 if the connection has been established (S1204). Otherwise, the computer 101 checks whether a connection request has been sent from the base location (S1203), and connects with the server 10 if the connection request has been sent from the base location (S1204). If a connection request has not been sent, the computer 101 returns to Step S1202, and waits.

After the computer 101 has connected to the server 10, first, the server 10 generates the voice, for which the volume has been adjusted, for the respective locations. The server 10 checks whether there are any records of manipulation of users 905 for the respective locations (S1205), if there are records of manipulation of users 905, the server 10 carries out volume manipulation, in which the server 10 changes the volume configuration for the voices sent from a sender location of voice in the speaker volume 904 based on the direction of the sound source of the sender location of voice (S1206). Then, if there are no records of manipulation of users 905, or the volume manipulation has been ended, the server 10 changes the volume based on the volume configurations for the voices sent from the respective sender locations and the direction of the sound sources sent from the respective sender locations. After the server 10 has changed the volume, the server 10 mixes the voices for all the locations other than that for the sender location, and sends the mixed voices to the respective locations (S1207).

Then, the respective locations carry out the acoustic echo canceller, the sound source localization, and the voice activity detection (S1208), and sends a voice processed by those processes, and information on the direction of the sound source to the server 10 (S1209).

The computer 101 determines whether or not the server 10 has been disconnected (S1210), and if the server has been disconnected, the computer 101 carries out a process to disconnect the server 10, and ends the process (S1212).

If the server 10 has not been disconnected, the computer 101 checks whether a disconnection request indicating that the base location requests to be disconnected (S1211) has been sent from the base location, and, if a disconnection request has been sent, disconnects the connection to the server 10, and ends the process (S1212). On the other hand, if a disconnection request has not been sent, the computer 101 returns to Step S1205, and repeats the subsequent process.

Figure 16:
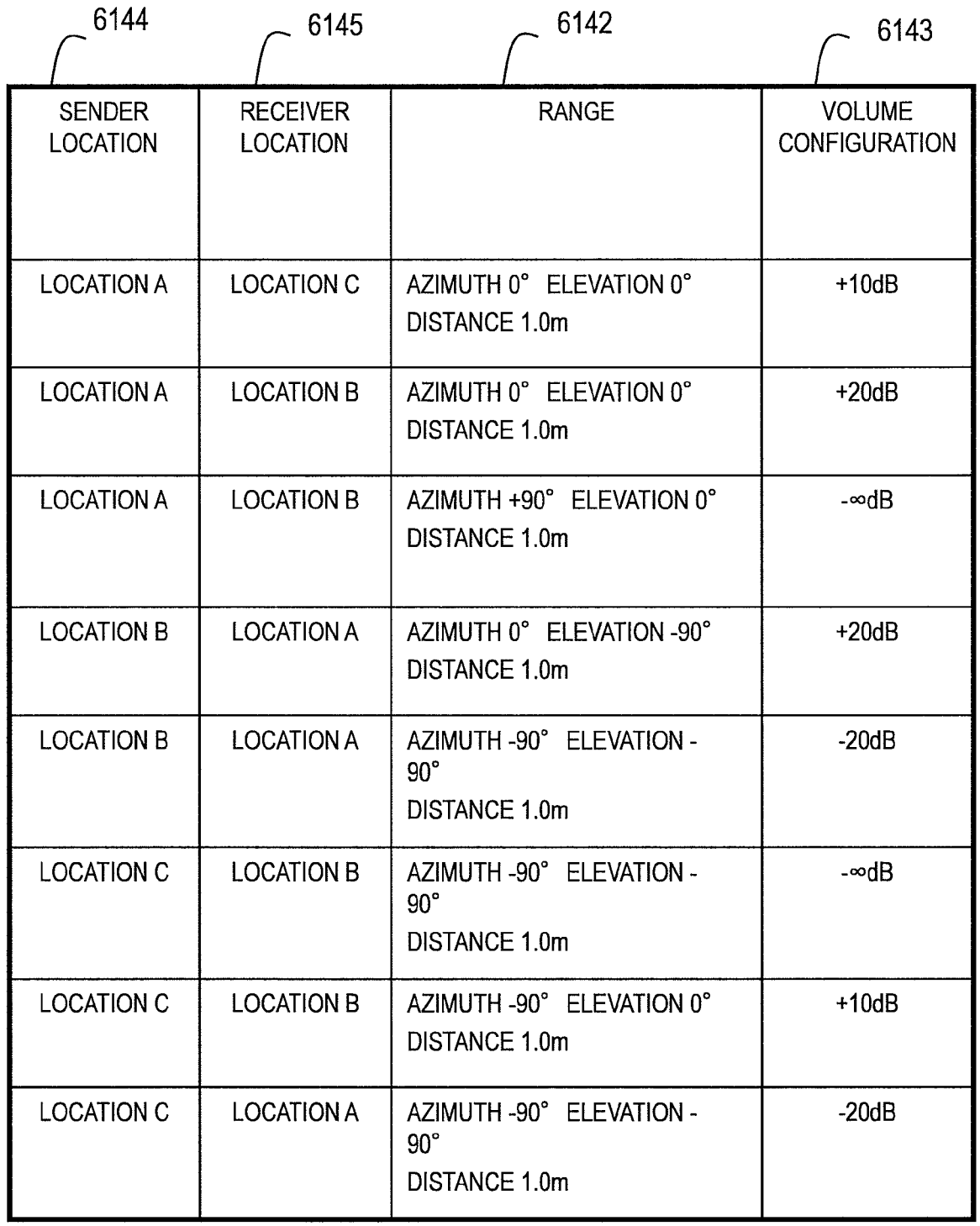
FIG. 16 shows a data structure of the speaker volume adjustment data when the volume is adjusted by the server 10 according to the second embodiment.

FIG. 16 shows a data structure of the speaker volume adjustment data when the volume is adjusted by the server 10 according to the second embodiment. The speaker volume adjustment data is stored in the speaker volume 904 shown in FIG. 14, and contains four types of information: information on a sender location 6144; information on a receiver location 6145; information on an adjustment range of a sound source 6142; and a volume configuration 6143. For example, a first row of FIG. 16 implies that, if the range of the sound source of a voice received from the location A is in a range of the azimuth 0°, the elevation 0°, and the distance 1.0 m, the voice is amplified by 10 dB, and is sent to the location C.

Figure 17:
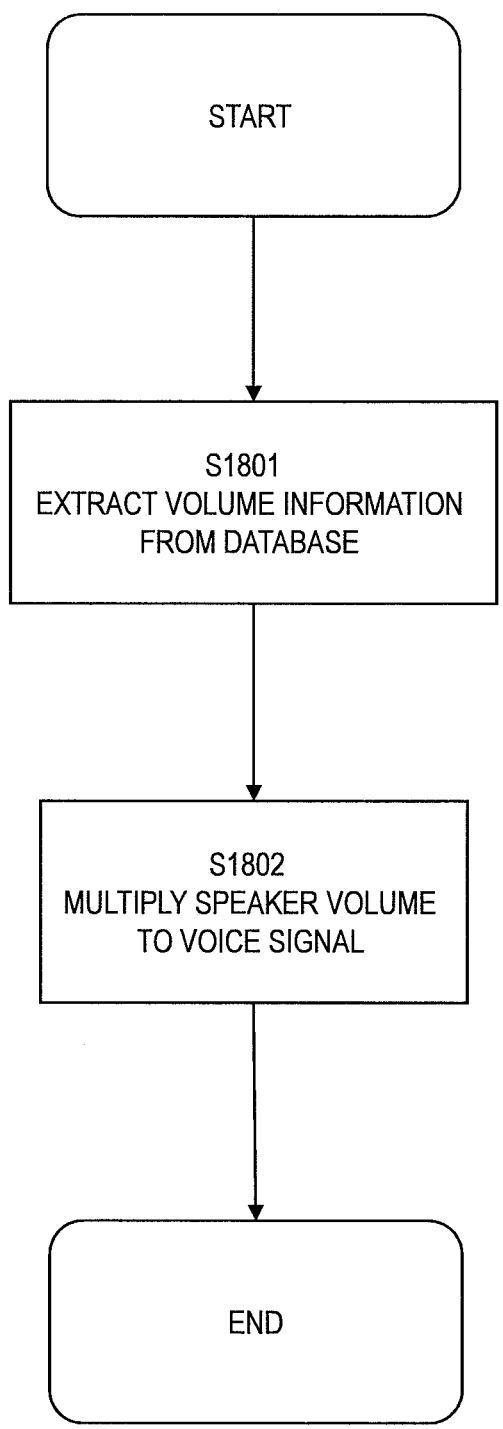
FIG. 17 shows a process flow of the volume adjustment carried out in Step S1207 shown in FIG. 15 according to the second embodiment.

FIG. 17 shows a process flow of the volume adjustment carried out in Step S1207 shown in FIG. 15 according to the second embodiment.

First, the server 10 searches the speaker information 904 shown in FIG. 16 for speaker volume adjustment data as the volume information with the information of the sender location 6144, the information of the receiver location 6145, and the direction of the adjustment range 6142 (direction of sound source) as search keys, and extracts a volume configuration (S1801).

Then, the server 10 multiplies the voice (time domain signal) received from the sender location by the volume configuration, thereby adjusting the volume (S1802).

As a result of the above process, the server 10 can carry out an automatic correction to volume set in advance according to speakers for respective receiver locations.

As described above, the second embodiment, similarly to the first embodiment, includes the sound source localization block 608 for estimating a direction of a sound source, the voice activity detector block 607 for estimating a voice activity based on volume, the volume adjustment for each location block 901 for identifying which speaker utters based on information on the direction of the sound source across the entire voice activity, and setting the volume corresponding to the speaker, and the volume manipulation for each location block 903 for manipulating only the volume of a speaker who has uttered before and after the volume manipulation carried out on the volume adjusting remote controller 1601 by a user. As a result, it is possible on the server 10 to set a proper volume for the respective speakers, and, when a speaker is switched, since the volume is automatically adjusted by automatically reading volume set for the subject speaker by a user in advance from the speaker volume 904, it is also possible to eliminate a complicated manipulation of the volume by the user, resulting in an increase in operability of the TV conference system 100.

Thus, according to this invention, it is possible to prevent the volume from temporarily deviating from a proper level when a speaker is switched, and to correct the volume to a proper level for respective speakers without a complicated manipulation of the volume by a user.

Moreover, since the correction is carried out so that volume configured for a speaker identified by the information on the direction of the sound source is attained, it is possible to prevent a background noise from being incorrectly recognized as an uttered voice, and from being incorrectly amplified.

Third Embodiment

Figure 18:
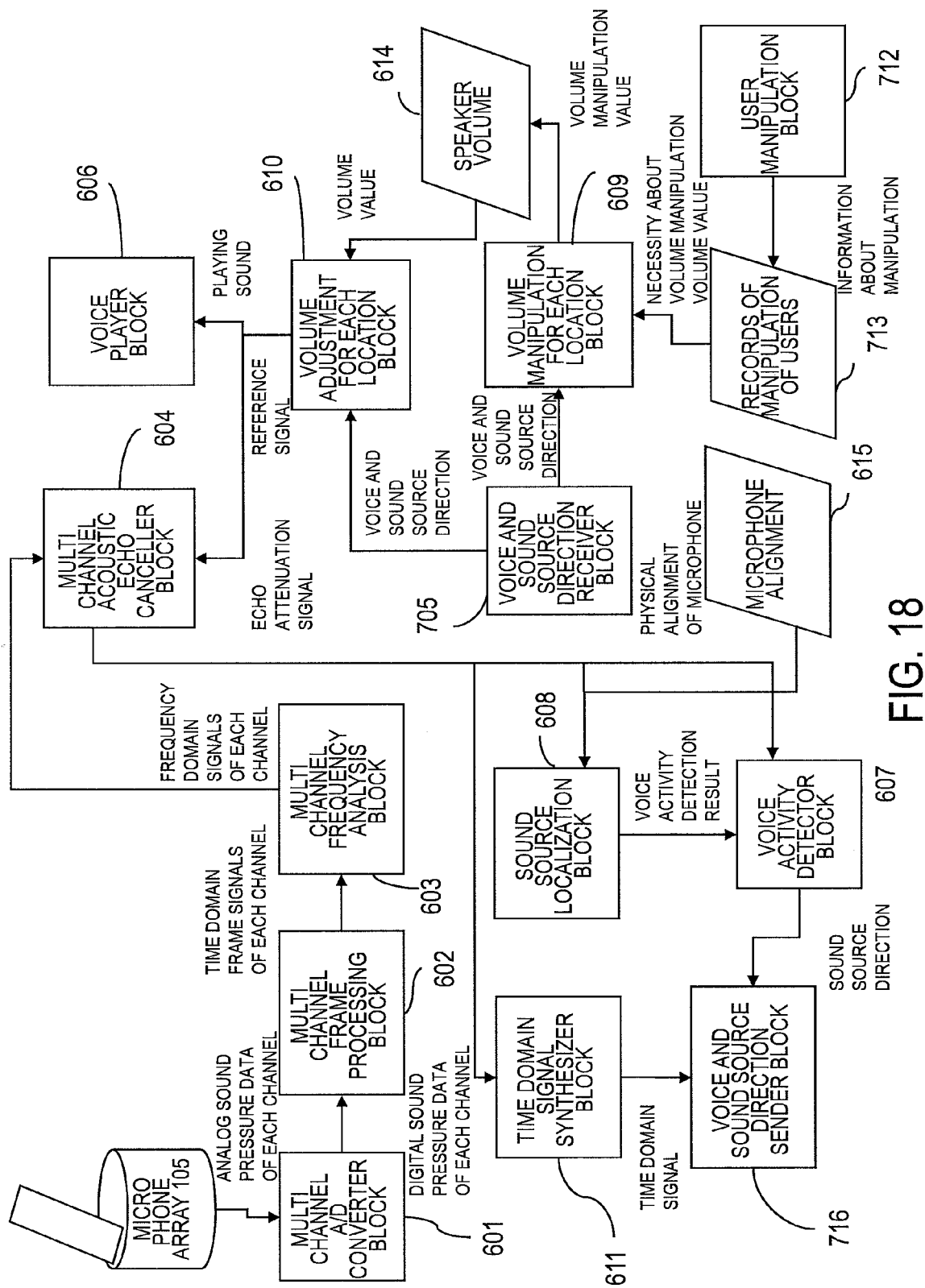
FIG. 18 is a block diagram showing a configuration of the computer system on the location for the case in which a receiver location adjusts the volume according to the third embodiment.
Figure 19:
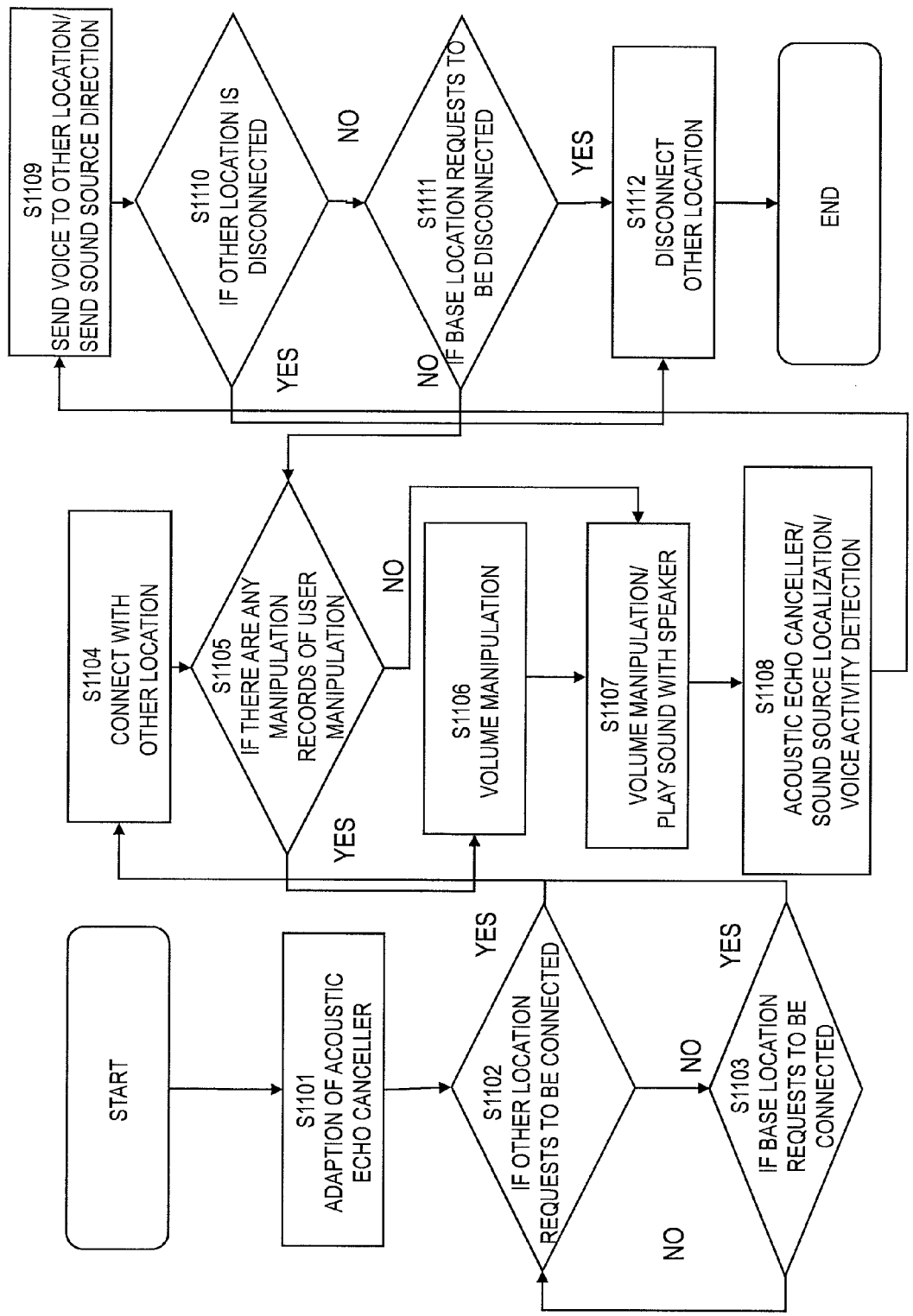
FIG. 19 is a flowchart showing a process according to the third embodiment from a start to an end of the TV conference system 100 of the type in which the receiver location of a voice adjusts the volume according to this invention.
Figure 20:
FIG. 20 shows a data structure of the speaker volume adjustment data when the volume is adjusted by a receiver location of a voice according to the third embodiment.

FIGS. 18 to 20 show a third embodiment, which has a configuration in which locations directly communicate with each other as shown in FIG. 3 according to the first embodiment, and a receiver location adjusts the volume.

FIG. 18 is a block diagram showing a configuration of the computer system on the location for the case in which a receiver location adjusts the volume according to the third embodiment, which is opposite to the first embodiment.

In FIG. 18, a process in the multi channel A/D converter block 601 is carried out by the A/D D/A converter 102, shown in FIG. 1, and a process subsequent to the multi channel frame processing block 602 is carried out by the computer 101. Moreover, the same components are denoted by the same numerals as shown in FIG. 6 of the first embodiment, and will not be further explained.

In the computer system on the respective locations according to the third embodiment, since a receiver location adjusts the volume, while, according to the first embodiment, the processing blocks relating to the volume carry out the process for voices of the base location, the processing blocks relating to the volume carry out the process for voices sent from other locations, which is a difference, but the process itself is the same as that of the first embodiment.

The computer 101, based on the voice detected by the microphone array 105, sends a direction of a speaker (direction of sound source) and a voice signal from which a background noise has been removed to the other locations.

The user manipulation block 712 receives manipulation for amplification, attenuation, and muting instructed on the volume adjusting remote controller 1601 by a user of the base location. The received information about volume manipulation is sent to and recorded in records of manipulation of users 713. The records of manipulation of users 713 also store information on a time point at which the information about volume manipulation is stored. The voice and sound source direction receiver block 705 receives a voice (time domain signal) O2_loc,i(t) and an estimated direction of arrival Θ (direction of sound source) of the voice of the respective locations. The received voice and the direction of the sound source thereof of the respective locations are sent to the volume adjustment for each location block 610.

The volume adjustment for each location block 610 reads the volume configuration Vloc(φ) for the respective locations and for respective directions of sound sources stored in the speaker volume 614, and carries out the volume adjustment according to the equation 2. If a direction of a sound source is NULL, a corresponding volume configuration Vloc(φ) is 1.

The volume adjustment for each location block 610 sums the signals for which the volume has been adjusted into a signal X(t), and outputs the signal X(t). The volume manipulation for each location block 609 does not carry out the following process if NULL is assigned to a direction of a sound source. If the records of manipulation of users 713 store information about volume manipulation of a user, the volume manipulation is carried out sequentially from the oldest information about volume manipulation. However, if a difference between time of record of information about volume manipulation and the present time exceeds the predetermined maximum difference of time, the volume manipulation is not carried out. Previous information about volume manipulation stores information on how much a voice is amplified, attenuated, or muted in which range of a direction at which location. In other words, a user manipulation block 712 is provided with an interface used by a user for entering such information. According to this information, the volume manipulation for each location block 609 updates the speaker volume 614. The time domain signal synthesizer block 611 transforms the signal processed by the acoustic echo canceller into a time domain signal by the inverse FFT, adds the signal with an overlap at the predetermined frame period, applies the inverse of the window function to the signal, and sends the processed signal to a voice and sound source direction sender block 716. The voice and sound source direction sender block 716 sends both information on the direction of the sound source detected by the voice activity detector block 607 and the time domain signal output from the time domain signal synthesizer block 611 to the other locations. If the voice activity detector block 607 cannot detect a direction of a sound source, the voice activity detector block 607 sends the direction of the sound source as NULL.

FIG. 19 is a flowchart showing a process according to the third embodiment from a start to an end of the TV conference system 100 of the type in which the receiver location of a voice adjusts the volume according to this invention.

The TV conference system 100 is started by starting the components of the system such as the computer 101 and the microphone array 105 at the respective locations, shown in FIG. 1. After the TV conference system 100 starts, the computer 101 carries out the adaptation of the acoustic echo canceller (S1101).

In the adaptation of the acoustic echo canceller, the computer 101 plays a white signal and a full band signal according to the NLMS method, which changes in frequency along time, on the speaker 106, thereby initializing the filter for the acoustic echo canceller.

Then, the computer 101 of the TV conference system 100 waits until the computer 101 receives a connection request indicating that the other location requests to be connected (S1102) from the other location, or a connection request indicating that the base location requests to be connected (S1103) is sent from the base location to the other location. In Step S1102, the computer 101 checks whether a connection has been established from the other location, and connects to the other location if the connection has been established (S1104). Otherwise, the computer 101 checks whether a connection request has been sent from the base location (S1103), and connects to the other location if the connection request has been sent (S1104). If a connection request has not been sent from the base location, the computer 101 returns to Step S1102, and waits until the computer 101 receives a connection request from the other location, or a connection request is sent from the base location.

After the connection, the computer 101 checks whether there are any records of volume manipulation 713 carried out by a user of the base location (S1105), and if there are records of volume manipulation, the computer 101 proceeds to Step S1106, and carries out the volume manipulation. Then, in Step S1107, the computer 101 manipulates the volume configuration of the voice sent from the other location according to the direction of the sound source sent from the other location. Then, if there is no record of manipulation of users 713, or the volume manipulation has been ended, the computer 101 manipulates the volume of the voice sent from the other location according to the volume configuration and the direction of the sound source sent from the other location, mixes the manipulated voices for all the locations other than that for the base location, and plays the mixed voice on the speaker 106.

Then, the computer 101 carries out the acoustic echo canceller, the sound source localization, and the voice activity detection (S1108), and sends the voice processed by those processes, and the information on the direction of the sound source respectively to the other locations (S1109).

The computer 101 determines whether the other location has been disconnected (S1110), and, if the connection has been disconnected, ends the connection to the other location (S1112). If the connection to the other location has not been disconnected, the computer 101 checks whether a disconnection request indicating that the base location requests to be disconnected (S1111) has been sent from the base location, and, if a disconnection request has been sent, the computer 101 disconnects the base location with the other location (S1112), and ends the process. If a disconnection request has not been received, the computer 101 returns to Step S1105, and repeats the above-mentioned process.

FIG. 20 shows a data structure of the speaker volume adjustment data when the volume is adjusted by a receiver location of a voice according to the third embodiment. The speaker volume adjustment data is stored in the speaker volume 614 shown in FIG. 18, and contains three types of information: information on the sender location 6144; information on the adjustment range of the sound source 6142; and the volume configuration 6143. For example, a first row of FIG. 20 implies that, if the range of the sound source of a voice received from the location A is in a range of the azimuth 0°, the elevation 0°, and the distance 1.0 m, the voice is amplified by 10 dB, and is played on the base location.

As described above, the third embodiment, similarly to the first embodiment, includes the sound source localization block 608 for estimating a direction of a sound source, the voice activity detector block 607 for estimating a voice activity based on volume, the volume adjustment for each location block 610 for identifying which speaker utters based on information on the direction of the sound source across the entire voice activity, and setting the volume corresponding to the speaker, and the volume manipulation for each location block 609 for manipulating only the volume of a speaker who has uttered before and after the volume manipulation carried out on the volume adjusting remote controller 1601 by a user. As a result, it is possible on the computer 101 of the receiver location to set a proper volume for the respective speakers, and, when a speaker is switched, since the volume is automatically adjusted by automatically reading volume set for the subject speaker by a user in advance from the speaker volume 614, it is also possible to eliminate a complicated manipulation of the volume by the user, resulting in an increase in operability of the TV conference system 100.

Thus, according to this invention, it is possible to prevent the volume from temporarily deviating from a proper level when a speaker is switched, and to correct the volume to a proper level for respective speakers without a complicated manipulation of the volume by a user.

Moreover, since the correction is carried out so that volume configured for a speaker identified by the information on the direction of the sound source is attained, it is possible to prevent a background noise from being incorrectly recognized as an uttered voice, and from being incorrectly amplified.

Moreover, while, in the above-mentioned respective embodiments, the example in which the TV conference system 100 changes the volume of a speaker is shown, the speech speed and the pitch of a voice may be changed instead of the volume. This configuration can increase the understanding of a voice. Moreover, by increasing the pitch of a voice having a low pitch, and tending to blur, the understanding of the voice increases similarly. Configurations of the volume, the speech speed, and the pitch may be stored in the volume configuration 6143 of the speaker volume 614 shown in FIGS. 8, 16, and 20 as playing information in a case of playing the voice, and the volume manipulation for each location block 609, based on the volume configuration 6143 of the speaker volume 614, can manipulate the volume, the speech speed, and the pitch of a voice to be played.

Moreover, in the above-mentioned respective embodiments, the two types of information: a direction of a sound source and a voice, are communicated, and by storing those two types of information in a storage device, and employing a voice search engine, it is possible to identify a time zone in which a desired speaker utters a desired keyword.

The configuration of this invention can be applied not only to the TV conference system, but also to a TV phone of a cellular phone and a handsfree communication device of a car navigation device.

Moreover, while, in the above-mentioned respective embodiments, as shown in FIGS. 8, 16, and 20, to the adjustment range 6142 of the speaker volume adjustment data, the azimuth of the respective speakers is set, by comparing the azimuth to which a predetermined range (+3° to −3°) is added with an estimated direction of arrival Θ calculated by the computer 101, it is possible to prevent an existing speaker from being incorrectly recognized as a new speaker.

<Supplement>

12. A voice communication method of carrying out voice communication between a plurality of locations including a first location and a second location connected via a network, including:

receiving, by the second location, a voice from the first location;

playing, by the second location, the received voice;

setting, by the second location, playing information for the voice being played;

sending, by the second location, the playing information to the first location;

identifying, by the first location, a direction of a sound source at the first location based on a voice collected by a plurality of sound collecting elements of a microphone array;

receiving, by the first location, the playing information from the second location;

storing, by the first location, the direction of the sound source being sent to the second location and the received playing information in association with each other in a speaker volume storage block;

acquiring, by the first location, the playing information corresponding to the direction of the sound source from the speaker volume storage block, and manipulating the collected voice based on the acquired playing information; and sending, by the first location, the manipulated voice to the second location.

13. A voice communication method of carrying out voice communication between a plurality of locations including a first location and a second location connected via a network, including:

identifying, by the first location, a direction of a sound source at the first location based on a voice collected by a plurality of sound collecting elements of a microphone array;

sending, by the first location, the collected voice and the identified direction of the sound source to the second location;

receiving, by the second location, the voice and the direction of the sound source from the first location;

playing, by the second location, the received voice;

setting, by the second location, playing information for the voice being played;

storing, by the second location, the set playing information and the received direction of the sound source in association with each other in a speaker volume storage block; and acquiring, by the second location, the playing information corresponding to the direction of the sound source of the voice being played from the speaker volume storage block, and manipulating the voice based on the playing information.

14. A voice communication method of carrying out voice communication between a plurality of locations including a first location, a second location, and a server connected via a network, including:

identifying, by the first location, a direction of a sound source at the first location based on a voice collected by a plurality of sound collecting elements of a microphone array;

sending, by the first location, the collected voice and the identified direction of the sound source to the server;

receiving, by the second location, the voice from the server;

playing, by the second location, the received voice;

setting, by the second location, the playing information for the voice being played;

sending, by the second location, the playing information to the server;

receiving, by the server, the voice and the direction of the sound source from the first location;

receiving, by the server, the playing information from the second location;

storing, by the server, the direction of the sound source received from the first location and the playing information received from the second location in association with each other in a speaker volume storage block;

acquiring, by the server, the playing information corresponding to the direction of the sound source from the speaker volume storage unit, and manipulating the received voice based on the acquired playing information; and sending, by the server, the voice manipulated by a voice manipulating block to the second location.

15. A computer-readable medium recorded with a program for carrying out voice communication between a plurality of locations including a computer at a first location and a computer at a second location connected via a network, the program causing the computer at the first location and the computer at the second location to carry out the processes of:

receiving, by the computer at the second location, a voice from the first location;

playing, by the computer at the second location, the received voice;

setting, by the computer at the second location, playing information for the voice being played;

sending, by the computer at the second location, the playing information to the first location;

identifying, by the computer at the first location, a direction of a sound source at the first location based on a voice collected by a plurality of sound collecting elements of a microphone array;

receiving, by the computer at the first location, the playing information from the second location;

storing, by the computer at the first location, the direction of the sound source being sent to the second location and the received playing information in association with each other in a speaker volume storage block;

acquiring, by the computer at the first location, the playing information corresponding to the direction of the sound source from the speaker volume storage block, and manipulating the collected voice based on the acquired playing information; and sending, by the computer at the first location, the manipulated voice to the second location.

16. A voice communication method of carrying out voice communication between a plurality of locations including a computer at a first location and a second location connected via a network, including the processes of:

identifying, by the computer at the first location, a direction of a sound source at the first location based on a voice collected by a plurality of sound collecting elements of a microphone array;

sending, by the computer at the first location, the collected voice and the identified direction of the sound source to the second location;

receiving, by the computer at the second location, the voice and the direction of the sound source from the first location;

playing, by the computer at the second location, the received voice;

setting, by the computer at the second location, playing information for the voice being played;

storing, by the computer at the second location, the set playing information and the received direction of the sound source in association with each other in a speaker volume storage block; and acquiring, by the computer at the second location, the playing information corresponding to the direction of the sound source of the voice being played from the speaker volume storage block, and manipulating the voice based on the playing information.

17. A computer-readable medium recorded with a program for carrying out voice communication between a plurality of locations including a computer at a first location, a computer at a second location, and a server connected via a network, the program causing the computer at the first location, the computer at the second location, and the server to carry out the processes of:

identifying, by the computer at the first location, a direction of a sound source at the first location based on a voice collected by a plurality of sound collecting elements of a microphone array;

sending, by the computer at the first location, the collected voice and the identified direction of the sound source to the server;

receiving, by the computer at the second location, the voice from the server;

playing, by the computer at the second location, the received voice;

setting, by the computer at the second location, the playing information for the voice being played;

sending, by the computer at the second location, the playing information to the server;

receiving, by the server, the voice and the direction of the sound source from the first location;

receiving, by the server, the playing information from the second location;

storing, by the server, the direction of the sound source received from the first location and the playing information received from the second location in association with each other in a speaker volume storage block;

acquiring, by the server, the playing information corresponding to the direction of the sound source from the speaker volume storage unit, and manipulating the received voice based on the acquired playing information; and sending, by the server, the voice manipulated by a voice manipulating block to the second location.

As described above, this invention can be applied to a communication device, which carries out voice communication between a plurality of locations at which a plurality of speakers are switched, such as a TV conference system, a TV phone, and a handsfree device for vehicles.

While the present invention has been described in detail and pictorially in the accompanying drawings, the present invention is not limited to such detail but covers various obvious modifications and equivalent arrangements, which fall within the purview of the appended claims.

What is claimed is:

1. A voice communication device for carrying out voice communication between a plurality of locations, comprising:
    a microphone array including a plurality of sound collecting elements for collecting a voice;
    a sound source direction identification block for identifying a direction of a sound source according to the voice collected by the plurality of sound collecting elements;
    a voice sender block for sending the collected voice to a different location;
    a voice receiver block for receiving a voice from the different location;
    a player block for playing the received voice;
    a playing information setting block for setting playing information for the voice being played;
    a speaker volume storage block for acquiring the direction of the sound source for which the playing information is set from the sound source direction identification block, and storing the direction of the sound source and the playing information in association with each other; and
    a voice manipulating block for acquiring the playing information corresponding to the direction of the sound source of the voice being played from the speaker volume storage block, and manipulating the voice based on the playing information,
    wherein the voice manipulating block determines whether the collected voice is a background noise or an uttered voice by using the playing information, amplifies the collected voice if it is determined that the collected voice is an uttered voice, and, when the direction of the sound source changes, acquires playing information corresponding to a new direction of the sound source from the speaker volume storage block, and manipulates the voice based on the playing information.

2. The voice communication device according to claim 1, wherein:
    the plurality of locations include a first location and a second location connected with each other via a network;
    the second location comprises:
        the voice receiver block for receiving a voice from the first location;
        the player block for playing the received voice;
        the playing information setting block for setting playing information for the voice being played; and
        a playing information sender block for sending the playing information to the first location; and
    the first location comprises:
        the sound source direction identification block for identifying a direction of a sound source at the first location based on the voice collected by the plurality of sound collecting elements of the microphone array;
        a playing information receiver block for receiving the playing information from the second location;
        the speaker volume storage block for acquiring the direction of the sound source being sent to the second location from the sound source direction identification block, and storing the direction of the sound source and the received playing information in association with each other;
        the voice manipulating block for acquiring the playing information corresponding to the direction of the sound source from the speaker volume storage block, and manipulating the collected voice based on the acquired playing information; and
        the voice sender block for sending the voice manipulated by the voice manipulating block to the second location.

3. The voice communication device according to claim 1, wherein:
    the plurality of locations include a first location and a second location connected with each other via a network;
    the first location comprises:
        the sound source direction identification block for identifying a direction of a sound source at the first location based on the voice collected by the plurality of sound collecting elements of the microphone array; and
        a sender block for sending the collected voice and the identified direction of the sound source to the second location; and
    the second location comprises:
        a receiver block for receiving the voice and the direction of the sound source from the first location;
        the player block for playing the received voice;
        the playing information setting block for setting playing information for the voice being played;
        the speaker volume storage block for storing the set playing information and the received direction of the sound source in association with each other; and
        the voice manipulating block for acquiring the playing information corresponding to the direction of the sound source of the voice being played from the speaker volume storage block, and manipulating the voice based on the playing information.

4. The voice communication device according to claim 1, wherein:
    the plurality of locations include a first location, a second location, and a server connected with each other via a network;
    the first location comprises:
        the sound source direction identification block for identifying a direction of a sound source at the first location based on the voice collected by the plurality of sound collecting elements of the microphone array; and
        a sender block for sending the collected voice and the identified direction of the sound source to the server;
    the second location comprises:
        the voice receiver block for receiving the voice from the server;

the player block for playing the received voice;
the playing information setting block for setting playing information for the voice being played; and
a playing information sender block for sending the playing information to the server; and
the server comprises:
a receiver block for receiving the voice and the direction of the sound source from the first location;
a playing information receiver block for receiving the playing information from the second location;
the speaker volume storage block for storing the direction of the sound source received from the first location and the playing information received from the second location in association with each other;
the voice manipulating block for acquiring the playing information corresponding to the direction of the sound source from the speaker volume storage block, and manipulating the received voice based on the acquired playing information; and
the voice sender block for sending the voice manipulated by the voice manipulating block to the second location.

5. The voice communication device according to claim 1, wherein the sound source direction identification block identifies a direction of a speaking speaker.

6. The voice communication device according to claim 1, wherein the playing information includes at least one of volume, speech speed, and pitch of a voice to be played.

7. The voice communication device according to claim 1, wherein:
the playing information includes volume of a voice to be played;
the playing information setting block manipulates the volume, the manipulation including muting; and
the voice manipulating block, when the playing information is mute, stops playing of the voice of a speaker speaking in the direction of the sound source corresponding to the playing information.

8. The voice communication device according to claim 1, wherein the speaker volume storage block considers the direction of the sound source as a direction of a speaker, and stores playing information in association with respective speakers.

9. The voice communication device according to claim 1, wherein the playing information setting block has a user interface for, when the playing information is set, displaying, on a display, a direction of a playing sound source as a direction of a speaker.

10. A voice communication method of carrying out voice communication between a plurality of locations, comprising:
collecting a voice by means of a microphone array including a plurality of sound collecting elements for collecting the voice;
identifying a direction of a sound source according to the voice collected by the plurality of sound collecting elements;
sending the collected voice to a different location;
receiving a voice from a different location;
playing the received voice;
setting playing information for the voice being played;
acquiring the direction of the sound source for which the playing information is set, and storing the direction of the sound source and the playing information in association with each other in a speaker volume storage block; and
acquiring the playing information corresponding to the direction of the sound source of the voice being played from the speaker volume storage block, and manipulating the voice based on the playing information,
determining whether the collected voice is a background noise or an uttered voice by using the playing information, and amplifying the collected voice if it is determined that the collected voice is an uttered voice, and, wherein, when the direction of the sound source changes, playing information corresponding to a new direction of the sound source is acquired from the speaker volume storage block, and the voice is manipulated based on the playing information.

11. A non-transitory, computer-readable medium recorded with a program for carrying out voice communication between a plurality of locations respectively including a computer, and causing the computer to carry out the process of:
collecting a voice by means of a microphone array including a plurality of sound collecting elements for collecting the voice;
identifying a direction of a sound source according to the voice collected by the plurality of sound collecting elements;
sending the collected voice to a different location;
receiving a voice from a different location;
playing the received voice;
setting playing information for the voice being played;
acquiring the direction of the sound source for which the playing information is set, and storing the direction of the sound source and the playing information in association with each other in a speaker volume storage block; and
determining whether the collected voice is a background noise or an uttered voice by using the playing information, and amplifying the collected voice if it is determined that the collected voice is an uttered voice, and, wherein, when the direction of the sound source changes, acquiring the playing information corresponding to the direction of the sound source of the voice being played from the speaker volume storage block, and manipulating the voice based on the playing information.

* * * * *